(12) United States Patent
Carter et al.

(10) Patent No.: US 12,052,978 B2
(45) Date of Patent: Aug. 6, 2024

(54) BIRDHOUSE INCORPORATING A CAMERA FOR REMOTE VIEWING

(71) Applicant: LoveNest Enterprises LLC, Atlanta, GA (US)

(72) Inventors: Robert M. Carter, Atlanta, GA (US); Frederick J. Carter, Atlanta, GA (US)

(73) Assignee: LoveNest Enterprises LLC, Atlanta, GA (US)

( * ) Notice: Subject to any disclaimer, the term of this patent is extended or adjusted under 35 U.S.C. 154(b) by 157 days.

(21) Appl. No.: 17/669,572

(22) Filed: Feb. 11, 2022

(65) Prior Publication Data

US 2022/0287278 A1    Sep. 15, 2022

Related U.S. Application Data

(60) Provisional application No. 63/160,045, filed on Mar. 12, 2021.

(51) Int. Cl.
*A01K 29/00* (2006.01)
*A01K 31/14* (2006.01)
*G03B 17/56* (2021.01)

(52) U.S. Cl.
CPC ........... *A01K 29/005* (2013.01); *A01K 31/14* (2013.01); *G03B 17/561* (2013.01)

(58) Field of Classification Search
CPC ....... A01K 29/005; A01K 31/14; A01K 39/01
See application file for complete search history.

(56) References Cited

U.S. PATENT DOCUMENTS

| | | | | |
|---|---|---|---|---|
| 7,721,677 | B1* | 5/2010 | McClaskey | A01K 31/14 119/329 |
| 10,697,947 | B1* | 6/2020 | Armitage | H02S 20/10 |
| 11,363,802 | B1* | 6/2022 | Nelson | A01K 31/14 |
| 2012/0048203 | A1* | 3/2012 | Bonham | A01K 31/14 119/421 |
| 2014/0123907 | A1* | 5/2014 | James | A01K 31/14 119/428 |
| 2014/0182518 | A1* | 7/2014 | Boehm | A01K 31/007 119/429 |
| 2018/0077908 | A1* | 3/2018 | Kratz | A01K 31/14 |
| 2019/0110444 | A1* | 4/2019 | Boehm | A01K 45/00 |
| 2019/0216044 | A1* | 7/2019 | Mazzapica | H04N 7/183 |
| 2022/0110300 | A1* | 4/2022 | Chong | A01K 31/14 |

* cited by examiner

*Primary Examiner* — Joshua J Michener
*Assistant Examiner* — Nicole Paige MacCrate
(74) *Attorney, Agent, or Firm* — Nelson Mullins Riley & Scarborough LLP; Anthony A. Laurentano

(57) ABSTRACT

A birdhouse comprises a housing. The housing includes inner volume and a camera platform disposed within the inner volume. The camera platform divides the inner volume into a nest chamber and a wiring chamber. A camera is connected to the camera platform. The housing also includes a portal that is in open communication with the nest chamber and the external environment. The housing further includes a channel extending through the nest chamber. The channel is in open communication with the wiring chamber and the environment external. The channel is configured to retain wiring.

23 Claims, 32 Drawing Sheets

BIRDHOUSE INCORPORATING A CAMERA FOR REMOTE VIEWING

RELATED APPLICATIONS

The present application claims priority to a provisional application entitled Birdhouse Design Incorporating Camera(s) and Information System Involving End-User Software Application having application No. 63/160,045 filed on Mar. 12, 2021 which is incorporated by reference herein in its entirety.

TECHNICAL FIELD

The following relates to a birdhouse and more particularly to a birdhouse with a camera.

BACKGROUND

A birdhouse is a man-made enclosure in which a bird nests. Birdhouses are used to encourage nesting within a given area. Birdwatching is a popular recreational activity in which people view birds in their natural habitat. Unfortunately, when a bird enters a birdhouse, birdwatchers are typically not able to see the bird as the view of the bird is obstructed by walls of the birdhouse.

SUMMARY

Aspects of the present disclosure address the above-referenced problems and/or others.

In one aspect, a birdhouse comprises a housing. The housing includes inner volume and a camera platform disposed within the inner volume. The camera platform divides the inner volume into a nest chamber and a wiring chamber. A camera is connected to the camera platform. The housing also includes a portal that is in open communication with the nest chamber and the external environment. The housing further includes a channel extending through the nest chamber. The channel is in open communication with the wiring chamber and the environment external. The channel is configured to retain wiring. In some embodiments, the camera is a webcam configured to provide a livestream of the nest chamber. In some embodiments, the housing includes a ventilation gap in open communication with the wiring chamber and the external environment.

The camera platform can be sized and shaped based on the size and shape of the camera. In some embodiments, the wiring chamber is vertically above the nest chamber and the camera is disposed within the nest chamber. In some embodiments, a latch can retain the camera in a position vertically below the camera platform. In some embodiments, the wiring chamber is vertically above the nest chamber and the camera is disposed within the wiring chamber. The camera platform can include an aperture extending through the camera platform and a lens of the camera is positioned vertically above or extends through the aperture. In some embodiments, the camera is removably connected to the camera platform.

The birdhouse can further include a solar panel connected to an exterior surface of the housing, wherein the solar panel is connected to the camera.

In some embodiments, the birdhouse includes a plurality of perching grooves disposed on a surface of the nest chamber, wherein each of the plurality of perching grooves are spaced equally apart.

In some embodiments, the birdhouse can include a nest chamber door that provides access to the nest chamber when open and a wiring chamber door that provides access to the wiring chamber when open, wherein the nest chamber door and the wiring chamber door are different.

In some embodiments, a bottom wall defines a bottom of the nest chamber and includes a plurality of beveled corners and each of the beveled corners of the bottom wall define an opening that is communication with the nest chamber and the external environment, and wherein the camera platform includes a plurality of beveled corners and each of the beveled corners of the camera platform define an opening that is communication with the wiring chamber and the nest chamber.

The birdhouse can include a nest chamber floor plate disposed in the nest chamber, wherein the nest chamber floor plate covers the openings defined by the beveled corners of the bottom wall and a wiring chamber floor plate disposed in the wiring chamber, wherein the wiring chamber floor plate covers the openings defined by the beveled corners of the camera platform. In other embodiments, the openings may be covered by a mesh covering. In some embodiments, the birdhouse may include one or more floor plates that slide into the birdhouse and rest upon the bottom wall or the camera platform. In some embodiments, the birdhouse includes at least one wall plate disposed within the nest chamber, wherein the wall plate reduces the width and/or depth of the nest chamber. In other embodiments, the vertical height of the nest chamber may be modified by raising or lowering a floor (also referred to as a "bottom wall") of the nest chamber.

The birdhouse can include a second camera connected to an exterior surface of the housing. The second camera can be a webcam configured to provide a livestream of the portal and area outside the birdhouse. In some embodiments, the second camera is connected to the exterior surface of the birdhouse either by being embedded into the surface of the birdhouse or the nest chamber cover or via an arm that includes a conduit, wherein conduit is in open communication with the channel and is configured to retain wiring associated with the second camera. In some embodiments, the camera platform disposed within the inner volume is a first camera platform and the second camera is connected to a second camera platform that is connected to the arm, and wherein the second camera platform is sized and shaped based on a size and shape of the second camera.

In another aspect, a birdhouse includes a housing that includes a nest chamber, a camera connected to an external surface of the housing via an arm, wherein the arm includes a conduit configured to retain wiring associated with the camera, and a channel extending through the nest chamber and in open communication with the conduit and an environment external from the housing, wherein the channel is configured to retain the wiring. In other embodiments, wiring associated with the camera may extend through the conduit and into a wiring chamber of the birdhouse via the channel. In these embodiments, the wiring chamber may include an AC power outlet and/or a battery that powers the camera.

BRIEF DESCRIPTION OF THE DRAWINGS

Aspects of the present disclosure may take form in various components and arrangements of components, and in various steps and arrangements of steps. The drawings are only for illustration purpose of preferred embodiments of the present disclosure and are not to be considered as limiting.

Features of embodiments of the present disclosure will be more readily understood from the following detailed description take in conjunction with the accompanying drawings in which.

DETAILED DESCRIPTION

Figure 1:
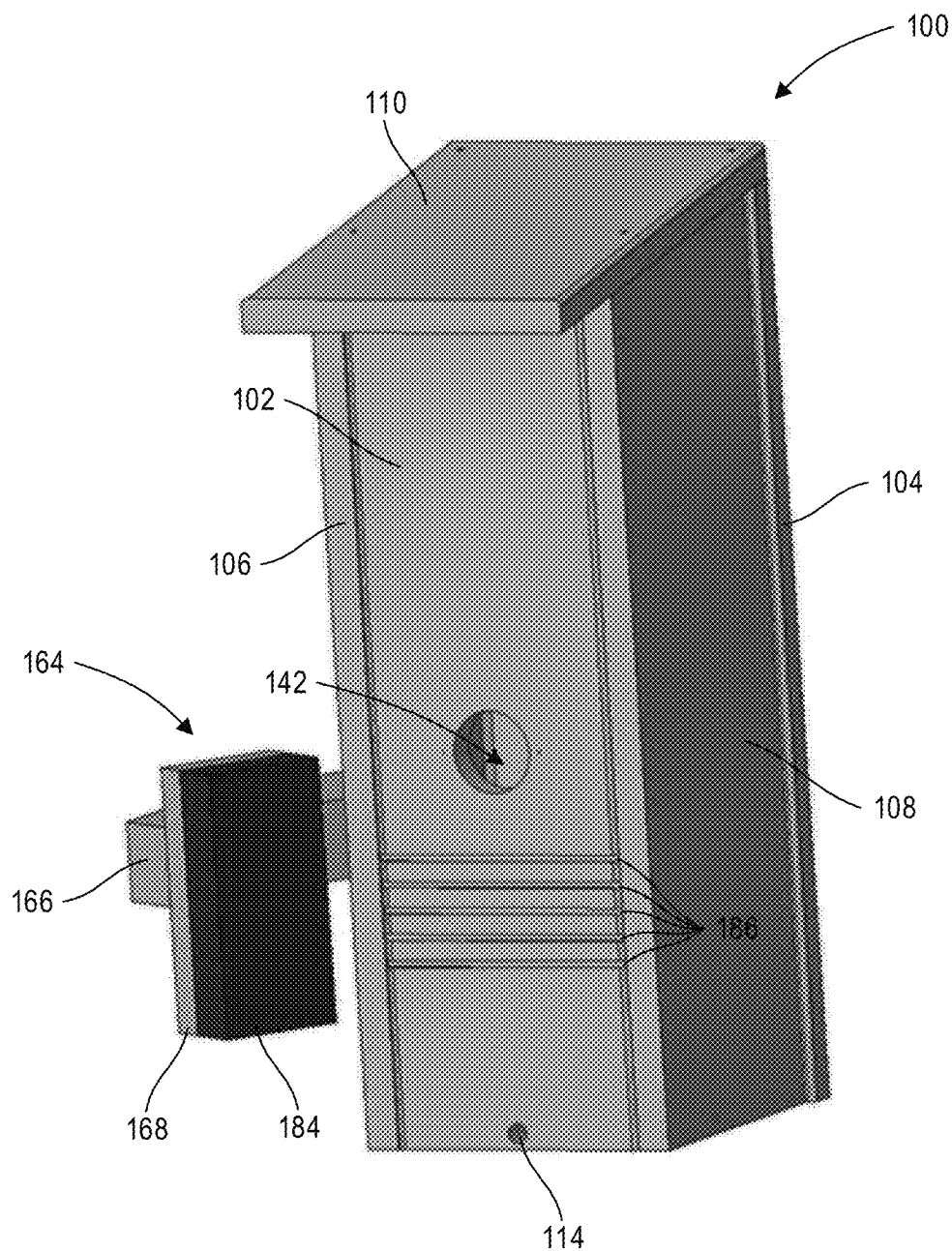
FIG. 1 depicts a birdhouse in accordance with an exemplary embodiment.
Figure 2:
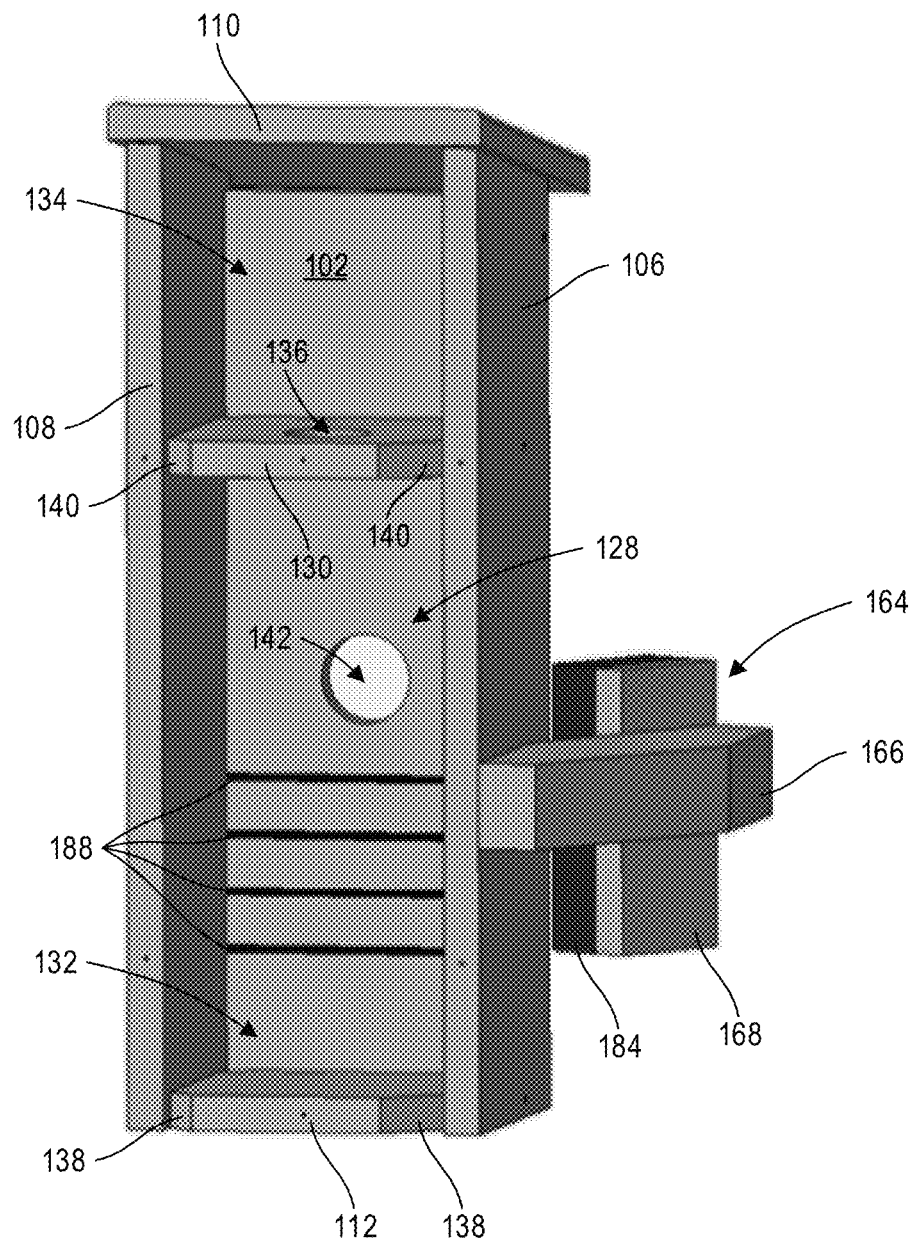
FIG. 2 is a rear view of the interior of the birdhouse in accordance with an exemplary embodiment.

The present disclosure generally relates to a birdhouse with a webcam provided therein.

As used herein, a "webcam" is a video camera that feeds or streams an image or video and optionally audio in real time through a computer network (e.g., the internet) to a computer system (e.g., laptop, smartphone, tablet, server, etc.). A webcam may connect to the computer network via a wireless or wired connection.

Various elements described herein may be descried as "connected" to one another. As used herein, elements may be connected via any means that cause the elements to retain a position with respect to each other. Means of connecting various elements include, but are not limited to, coupling via a screw, adhesive, tongue and groove, welding, applied pressure, or via magnetic forces. A removable connection allows a user to disconnect various elements without damaging the elements.

As used herein, the term "about" means plus or minus 10% of the numerical value of the number with which it is being used. Therefore, about 100 cm means in the range of 90 cm-110 cm.

Referring now to FIGS. 1-29, a birdhouse 100 is shown in accordance with an exemplary embodiment. The birdhouse 100 includes a front wall 102, a rear wall 104, a left-side wall 106, a right-side wall 108, a top wall 110 and a bottom wall 112. The walls 102, 104, 106, 108, 110, and 112, define a housing of the birdhouse 100.

A top end of the front wall 102 is connected (or hinged) to the left-side wall 106 and the right-side wall 108. The front wall 102 extends horizontally between and perpendicular to the left-side wall 106 and the right-side wall 108. The front wall 102 is connected to the left-side wall 106 and the right-side wall 108 such that the front wall 102 may pivot upwards (hereinafter referred to as an "open position"). In some embodiments, the front wall 102 is connected to the left-side wall 106 and the right-side wall 108 via a rod or two opposing rods, screws or bolts which allows the front wall 102 to rotate. In some embodiments, the front wall 102 may be removed from the birdhouse 100 by pulling the front wall 102 away from the birdhouse 100 and may be reconnected to the birdhouse 100 by pushing the front wall 102 into the birdhouse 100 (e.g., front wall 102 is connected to the birdhouse via a ball and socket pressure mount).

When the front wall 102 is closed (FIG. 1), the outer surfaces of the walls 102, 106 and 108 are flush. When the front wall 102 is in the open position, a user may access an interior of the birdhouse 100. In some embodiments, the front wall 102 further includes one or more rotatable latch(es) 114 that is configured to rotate 90° between a locked and an unlocked position. When the front wall 102 is in a closed position (FIG. 1) and the latch 114 is in the locked position, the latch 114 couples to the bottom wall 112 and prevents a user from opening the front wall 102. When the latch 114 is rotated to the unlocked position, the latch 114 decouples from the bottom wall 112 which allows a user to open the front wall 102.

Figure 3:
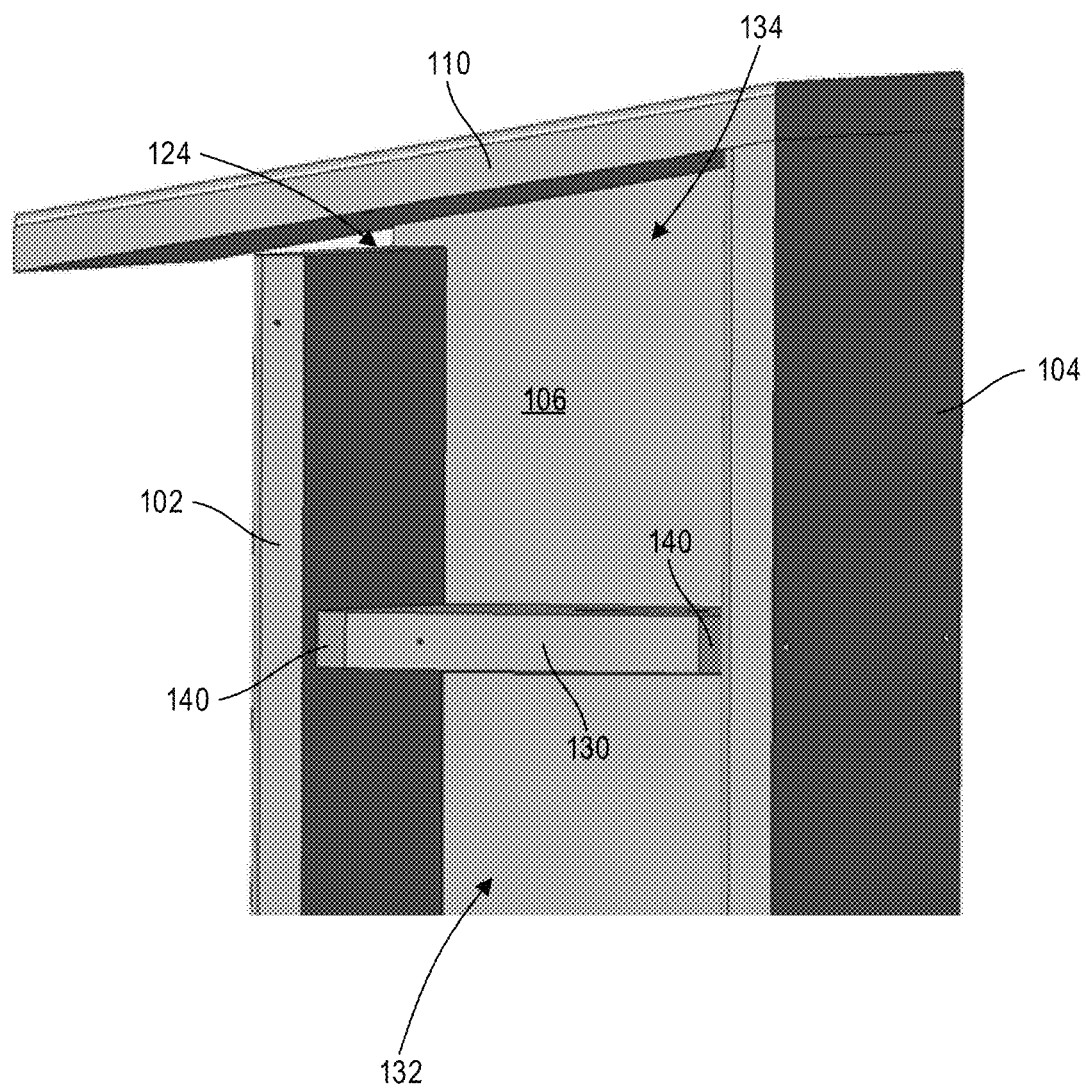
FIG. 3 is a side view of the interior of the birdhouse in accordance with an exemplary embodiment.
Figure 4:
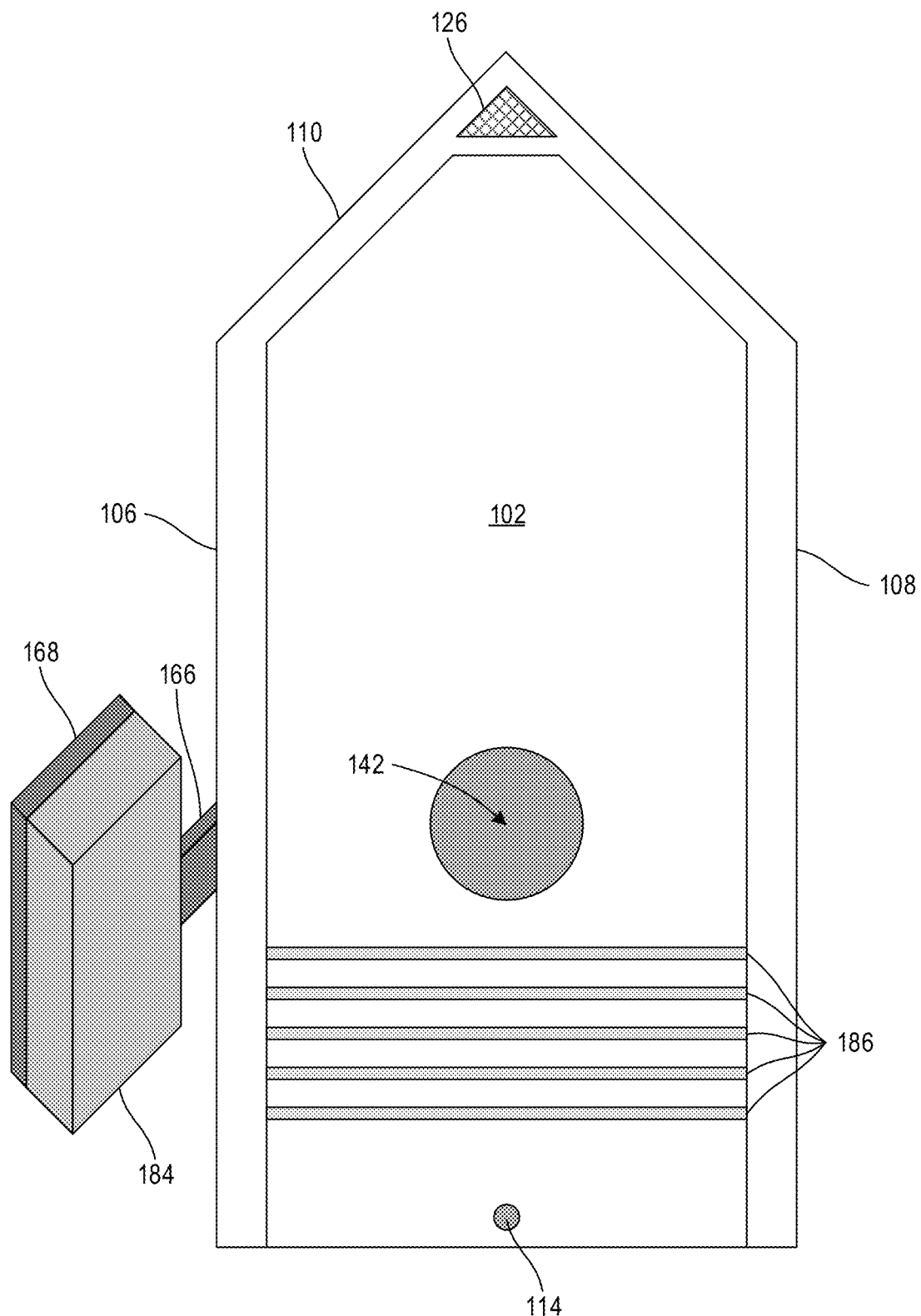
FIG. 4 depicts a birdhouse with an apexed roof in accordance with an exemplary embodiment.

The rear wall 104, the left-side wall 106, and the right-side wall 108 are connected to the top wall 110. The walls 104, 106, and 108 extend vertically from and perpendicular to the top wall 110. As depicted in FIG. 3, the top wall 110 is connected to the walls 104, 106, and 108, such that the top wall 110 pitches down towards the front wall 102. The top wall 110 overhangs the front wall 102. As such, when rainwater (or other precipitation) contacts the top wall 110, the water flows over the top wall 110 without entering the interior of the birdhouse 100. In some embodiments (FIGS. 4, 7, 10, and 26), the top wall 110 may be apexed such that the top wall 110 pitches downward towards the left-side wall 106 and the right-side wall 108. In these embodiments, water flows over the top wall 110 and towards either the left-side wall 106 or the right-side wall 108. Furthermore, the connection between the walls 104, 106, 108 and 110 may be sealed with a waterproof material which also prevents water from entering the birdhouse 100. Preventing water from entering the interior of the birdhouse 100 protects electronics (e.g., a camera) within the birdhouse 100 from water damage.

Figure 5:
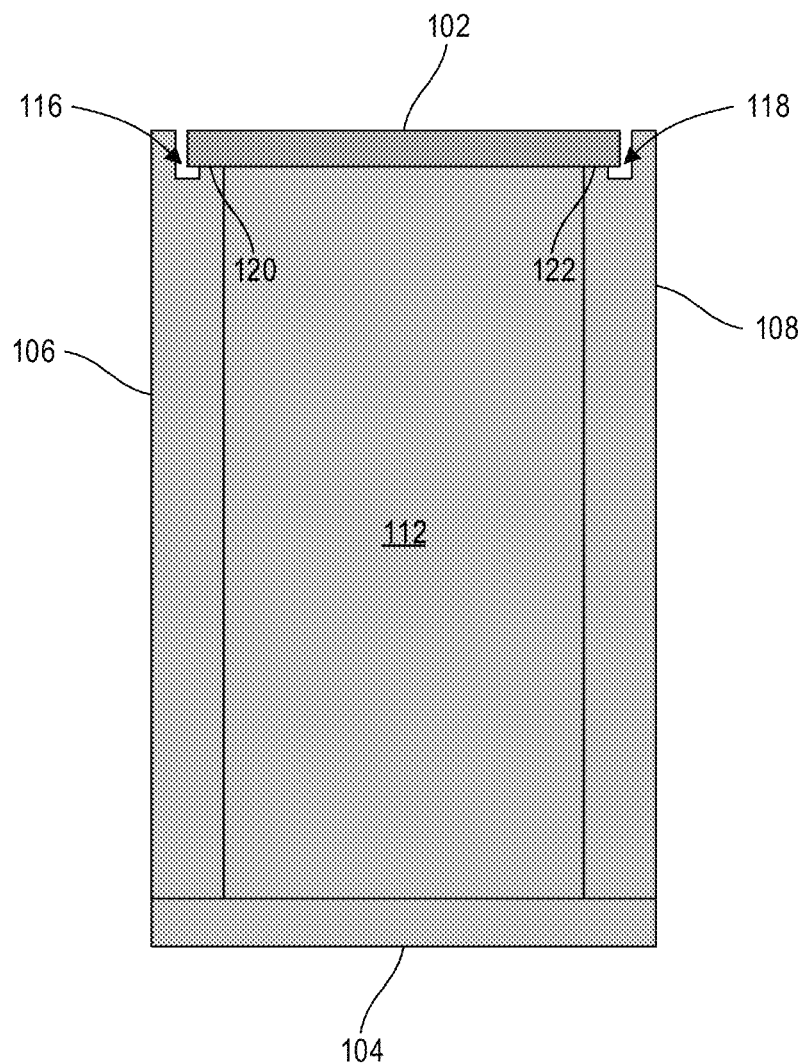
FIG. 5 is a top-down view of an interior of a birdhouse in accordance with an exemplary embodiment.
Figure 6:
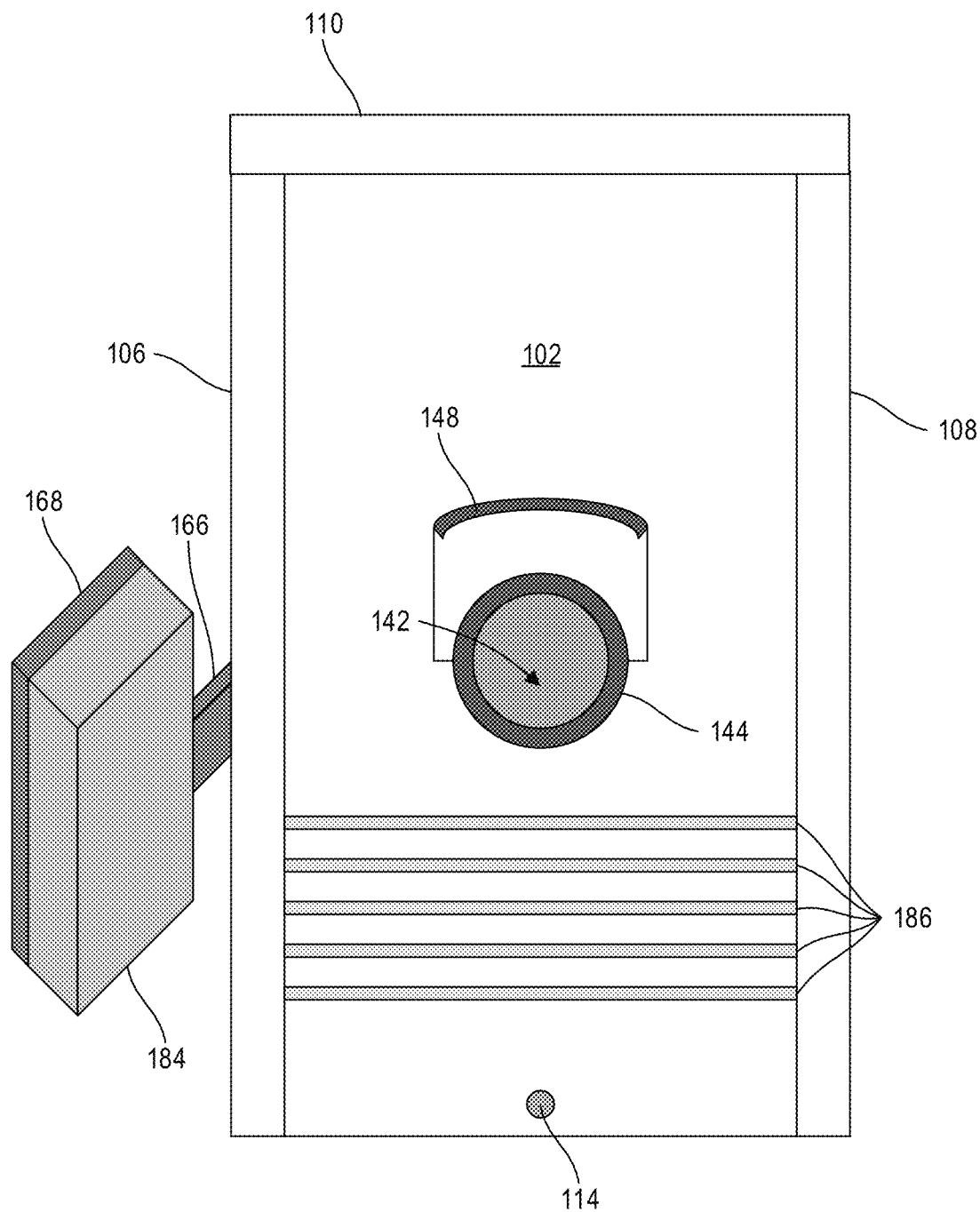
FIG. 6 depicts a birdhouse with a portal roof and a portal guard in accordance with an exemplary embodiment.

The birdhouse 100 may include additional elements for preventing water from entering the birdhouse 100. With reference to FIG. 5, the birdhouse 100 may further include a U-shaped channel 116 and a U-shaped channel 118. The U-shaped channels 116 and 118 are defined by side walls 106 and 108 and the front wall 102. As depicted in FIG. 5, in these embodiments the left-side wall 106 includes a notch 120 and the right-side wall 108 includes a notch 122 and the front wall 102 rests upon a surface of the notches 120 and 122 thereby defining a gap (the U-shaped channels 116 and 118) between the front wall 102 and the side walls 106 and 108. The U-shaped channels 116 and 118 carry rainwater (or other precipitation) away from the nest chamber and wiring chamber of the birdhouse 100. While FIG. 5 depicts the U-shaped channels 116 and 118 as between the side walls 106 and 108 and the front wall 102, in other embodiments, a U-shaped channel may be similarly formed between the top wall 110, the left-side wall 106 and the right-side wall 108.

Figure 7:
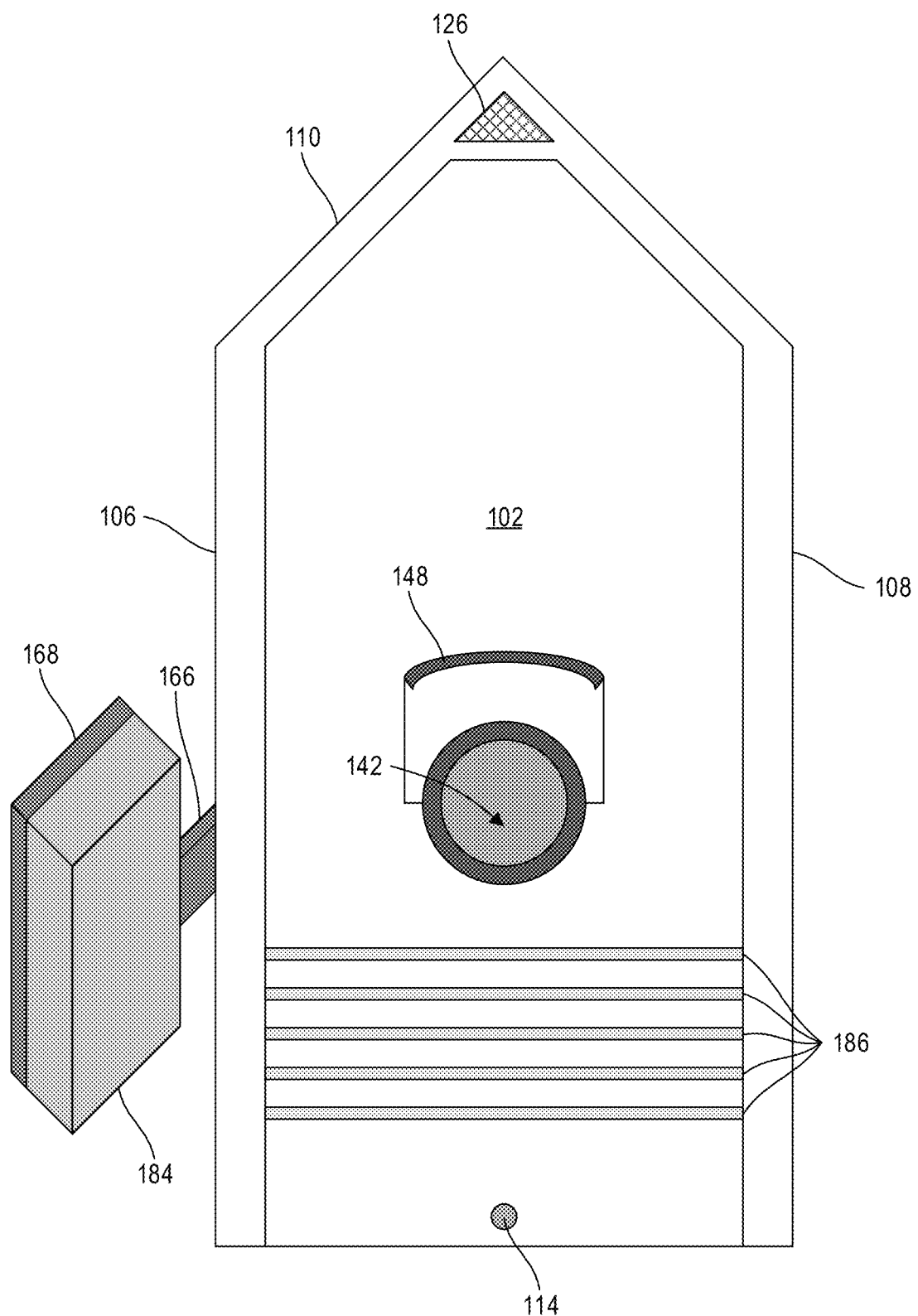
FIG. 7 depicts a birdhouse with an apexed roof, a portal roof, and a portal guard in accordance with an exemplary embodiment.
Figure 8:
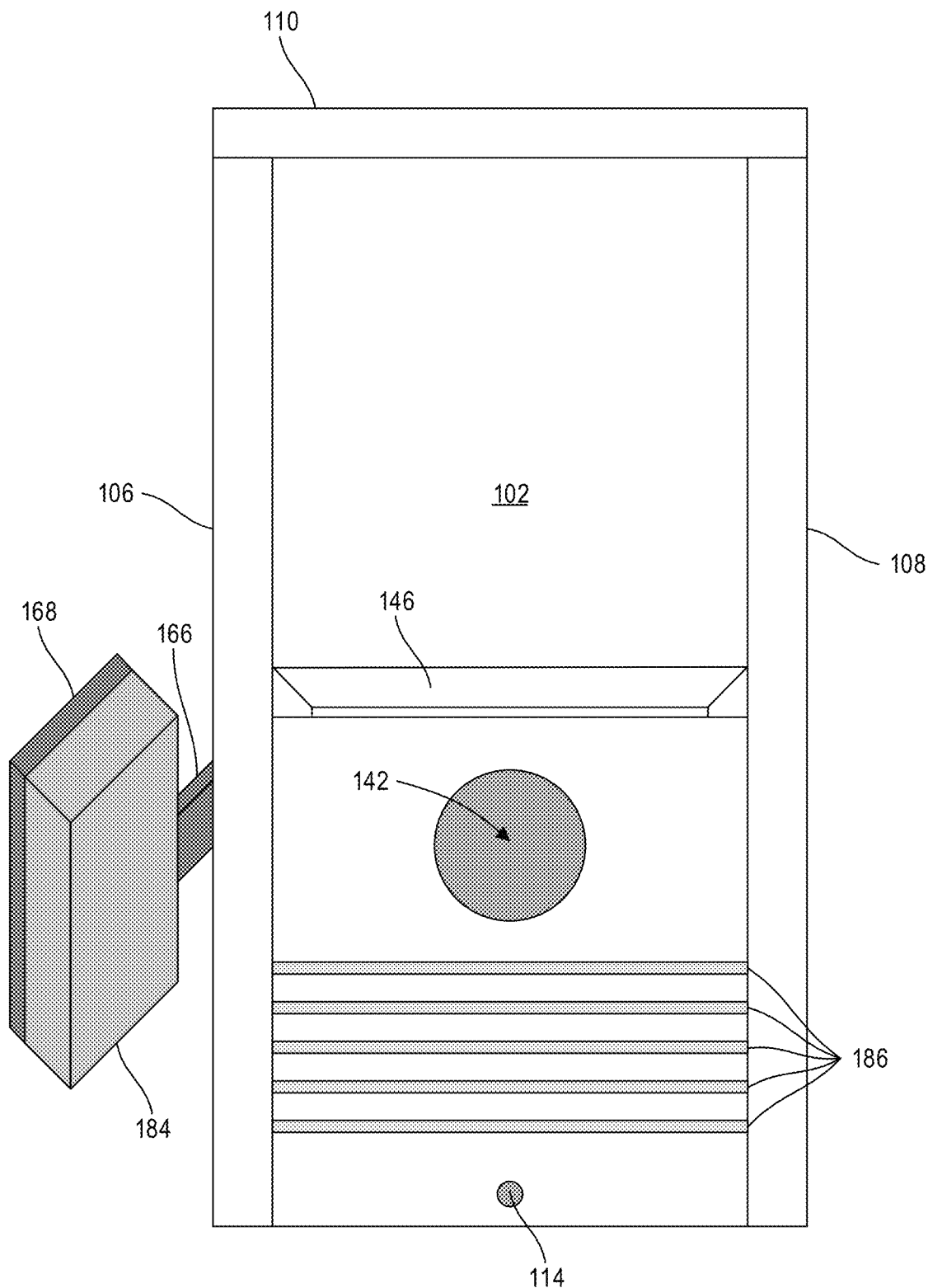
FIG. 8 depicts a birdhouse with an angled lip in accordance with an exemplary embodiment.
Figure 9:
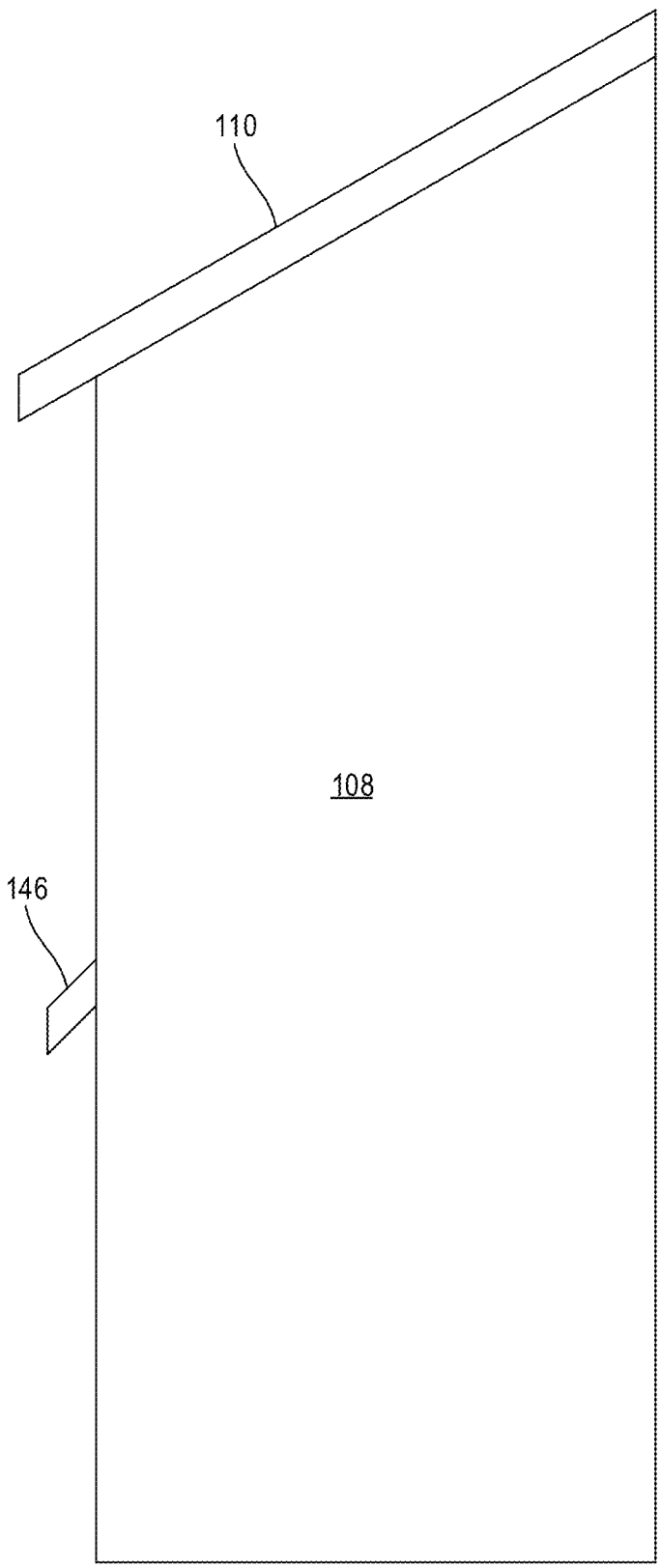
FIG. 9 is a side view of a birdhouse with an angled lip in accordance with an exemplary embodiment.
Figure 10:
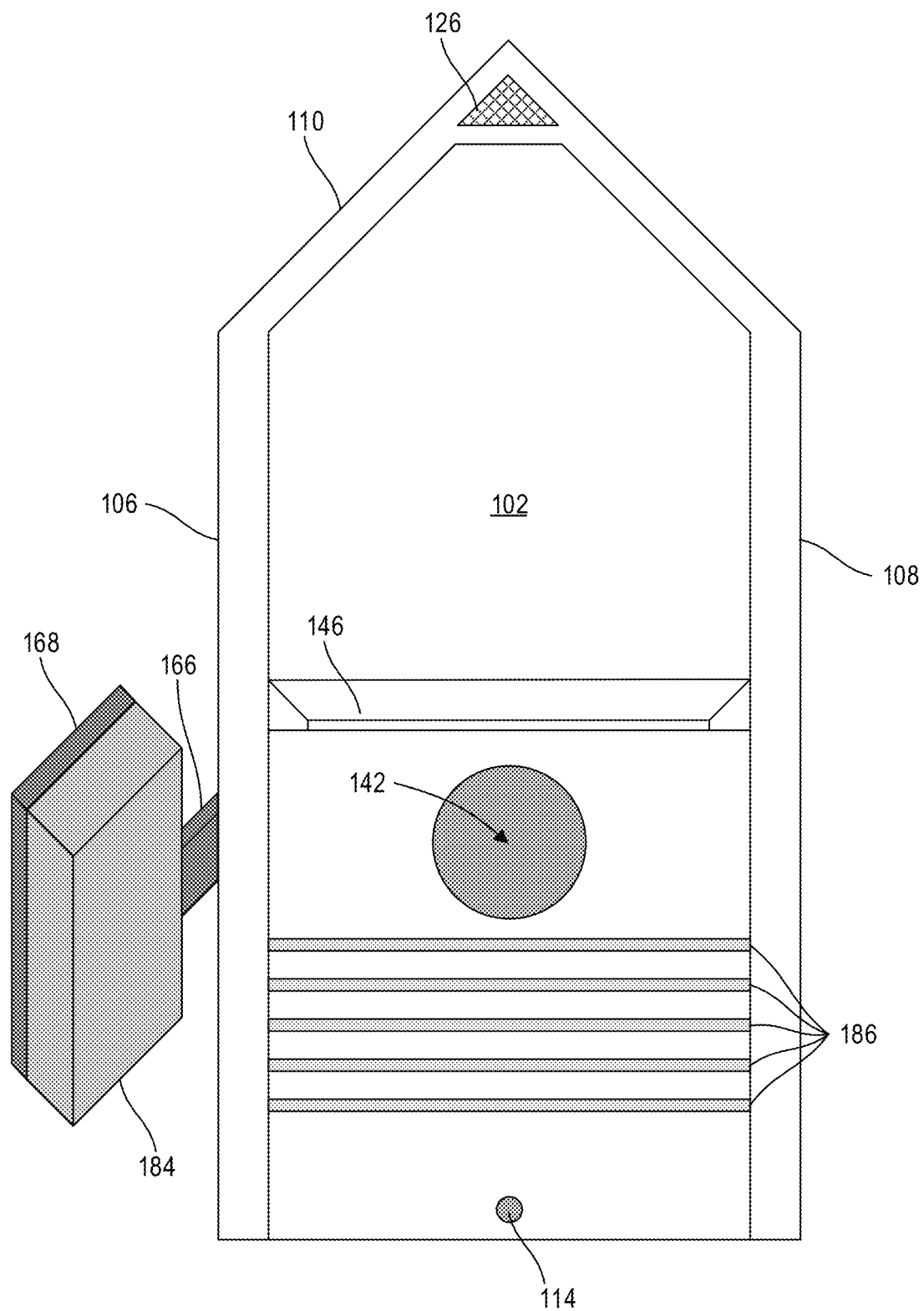
FIG. 10 depicts a birdhouse with an apexed roof and an angled lip in accordance with an exemplary embodiment.
Figure 11:
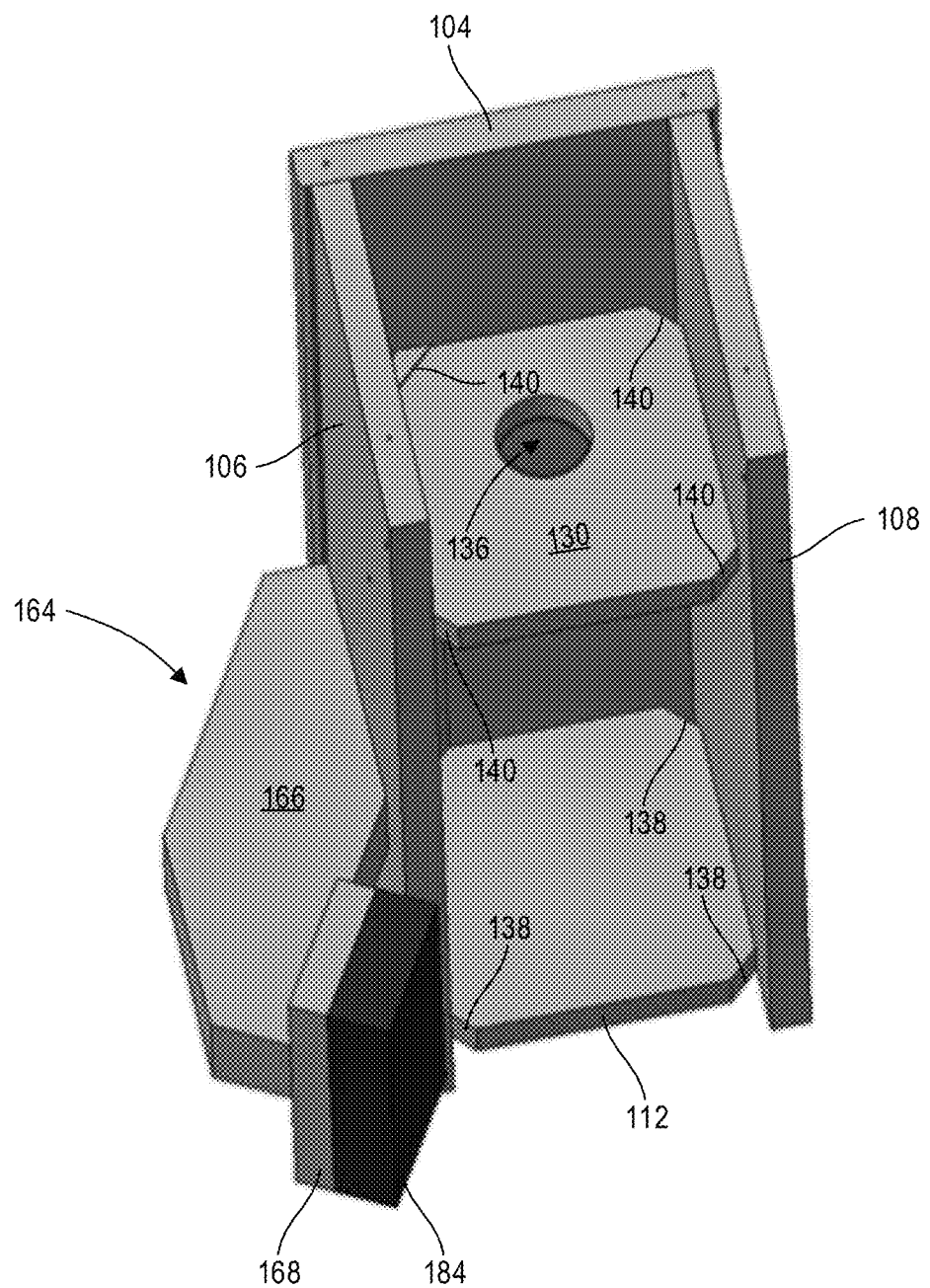
FIG. 11 is a downward view of the interior of the birdhouse in accordance with an exemplary embodiment.
Figure 12:
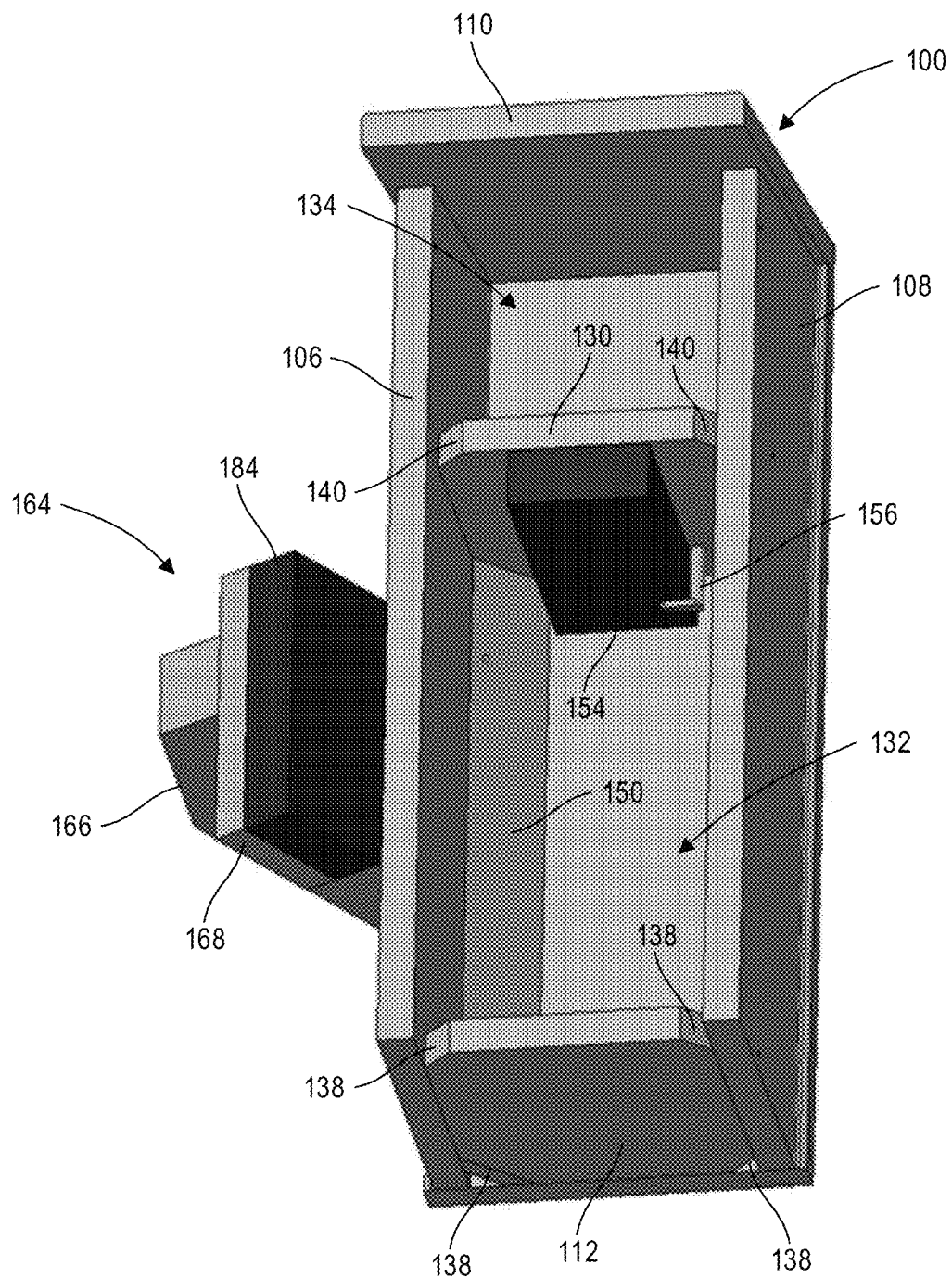
FIG. 12 is an upward view of the interior of the birdhouse in accordance with an exemplary embodiment.

The top wall 110 and the front wall 102 define a ventilation gap 124 that is in open communication with the external environment and an interior of the birdhouse 100. In some embodiments wherein the top wall 110 is apexed, the top wall 110 may include an opening between the external environment and the interior of the birdhouse 100. The opening may be covered by a mesh, which is hereinafter referred to as a mesh vent 126. The mesh employed in covering the opening may prevent the ingress of insects or other unwanted objects into the interior of the birdhouse 100. Similar mesh may be employed to cover other openings of the birdhouse that are not intended for bird entry (e.g., the openings of the bottom wall 112, ventilation openings of the walls 102-112, the ventilation gap 124, etc.). As such, while FIG. 7 depicts the birdhouse 100 as including one mesh vent 126, in other embodiments, the birdhouse 100 may include a plurality of mesh vents 126. Heat within the birdhouse 100 (e.g., heat generated by electronics within the birdhouse, heat from the sun or external temperature, heat from a bird within the birdhouse 100, etc.) may rise within the birdhouse 100 and may exit the birdhouse 100 via the ventilation gap 124 or the mesh vent(s) 126 thereby safeguarding the electronics as well as birds within the birdhouse 100 from excess heat.

The bottom wall 112 is connected to the rear wall 104, the left-side wall 106, and the right-side wall 108 such that the bottom wall 112 extends horizontally between and perpendicular to the walls 102, 104, 106, and 108. Furthermore, the bottom wall 112 is connected to the walls 102, 104, 106, and 108 such that bottom surfaces of the walls 102, 104, 106, and 108 and the bottom surface of the bottom wall 112 are flush. The uniform distance between the side walls 106 and 108 allows the same bottom wall 112 to be easily re-positioned higher or lower between the same side walls 106 and 108 using a tongue and groove slide-in method or by other means.

The left-side wall 106 and the right-side wall 108 are also connected to the rear wall 104 such that the left-side wall 106 and the right-side wall 108 extend perpendicular from the rear wall 104.

The walls 102-112 define an inner volume 128. The birdhouse 100 further includes a camera platform 130 disposed within the inner volume 128. The camera platform 130 is connected to (and/or positioned up against) the walls 104, 106, and 108 such that the camera platform 130 extends horizontally between and perpendicular to the walls 102, 104, 106, and 108. The camera platform 130 divides the inner volume 128 into a nest chamber 132 and a wiring chamber 134. The camera platform 130 includes an aperture 136 that extends through the camera platform 130.

The bottom wall 112 includes beveled corners 138 and the camera platform 130 includes beveled corners 140. The beveled corners 138 define openings which allow air to flow between the nest chamber 132 and the external environment. The beveled corners 140 define openings which allow air to flow between the nest chamber 132 and the wiring chamber 134.

The front wall 102 includes a portal 142 that extends through the front wall 102. The portal 142 may be dimensioned such that a bird of a certain size may enter the birdhouse 100 via the portal 142 while a larger animal (e.g., a squirrel, larger bird) may not. The portal 142 is positioned vertically below the camera platform 130 and as such, only the nest chamber 132 is accessible to a bird. In some embodiments (FIGS. 6 and 7) the front wall 102 includes a portal guard 144 that surrounds the portal 142. The portal guard 144 may be formed of a metal or other durable material and provides additional structural strength to the front wall 102.

The birdhouse 100 may include features for preventing water from entering the birdhouse nest chamber 132 via the portal 142. For example, in some embodiments, (FIGS. 8-10) the birdhouse 100 may further include an angled lip 146 extending from above the front wall 102 and across the front wall 102. The angled lip 146 is positioned vertically above the portal 142 and extends downward and away from the front wall 102. As such, when rainwater (or other precipitation) contacts the top angled lip 146, the water flows over the angled lip 146 without entering the nest chamber 132 via the portal 142. In other embodiments (FIGS. 6 and 7) the birdhouse 100 may include a portal roof 148 that is similar to the angled lip 146. The portal roof 148 is positioned vertically above the portal 142 and extends downward and away from the front wall 102. When water (or other precipitation) contacts the portal roof 148, the water flows over the portal roof 148 without entering the nest chamber 132 via the portal 142.

Figure 13:
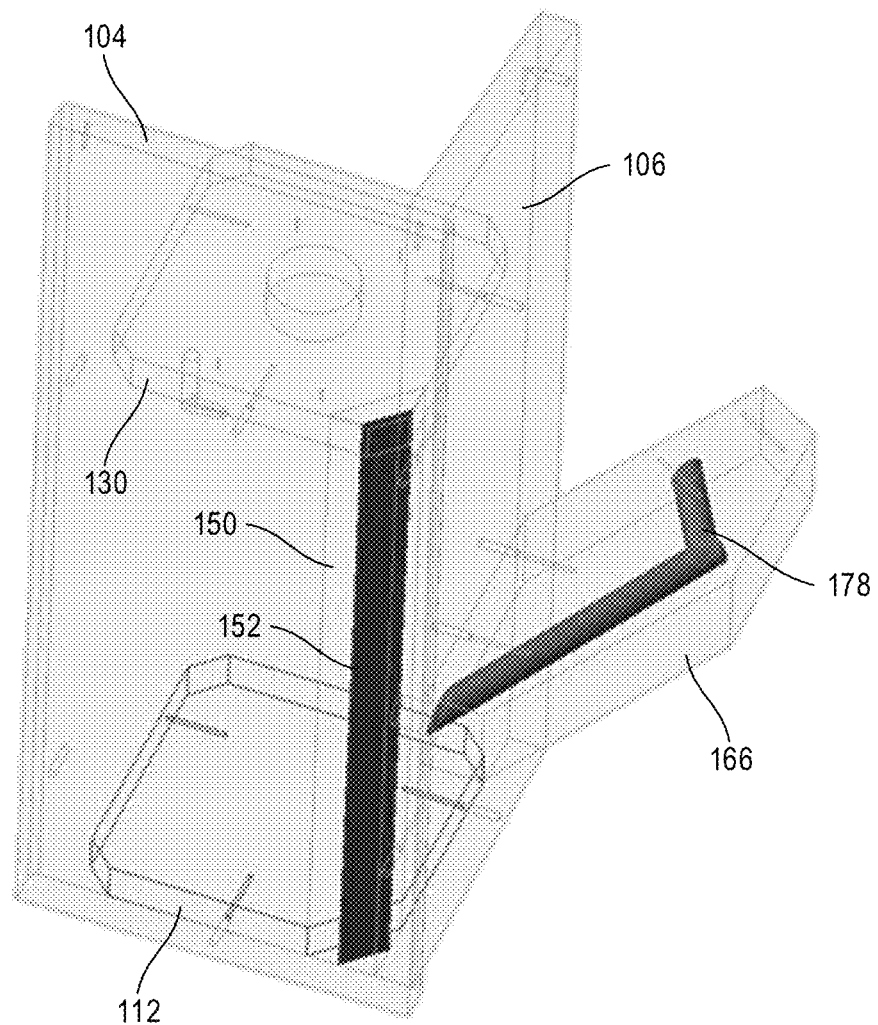
FIG. 13 is a schematic diagram illustrating inner channels of the birdhouse in accordance with an exemplary embodiment.
Figure 14:
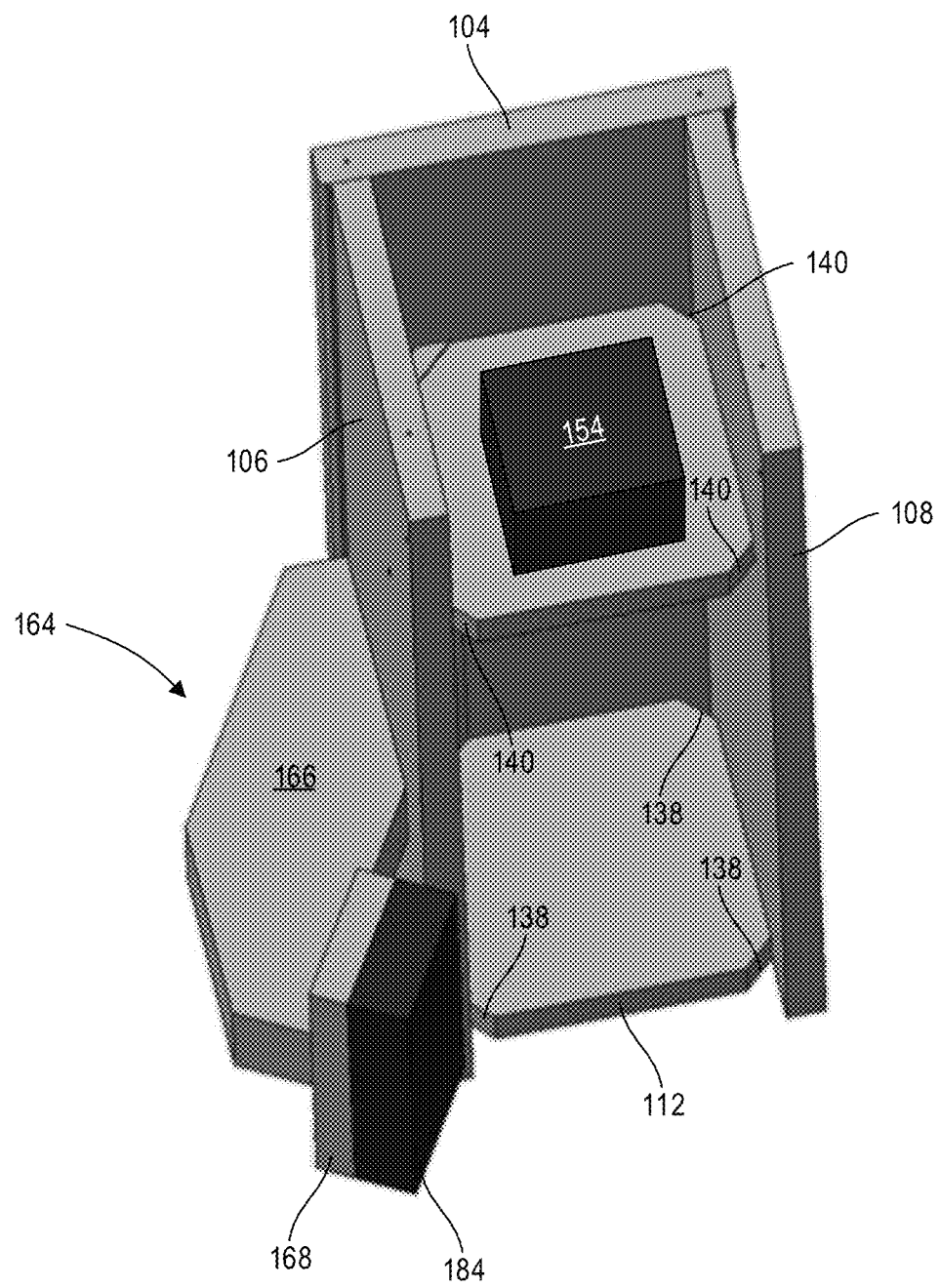
FIG. 14 is a view of the interior of the birdhouse wherein a camera is disposed above a camera platform in accordance with an exemplary embodiment.
Figure 15:
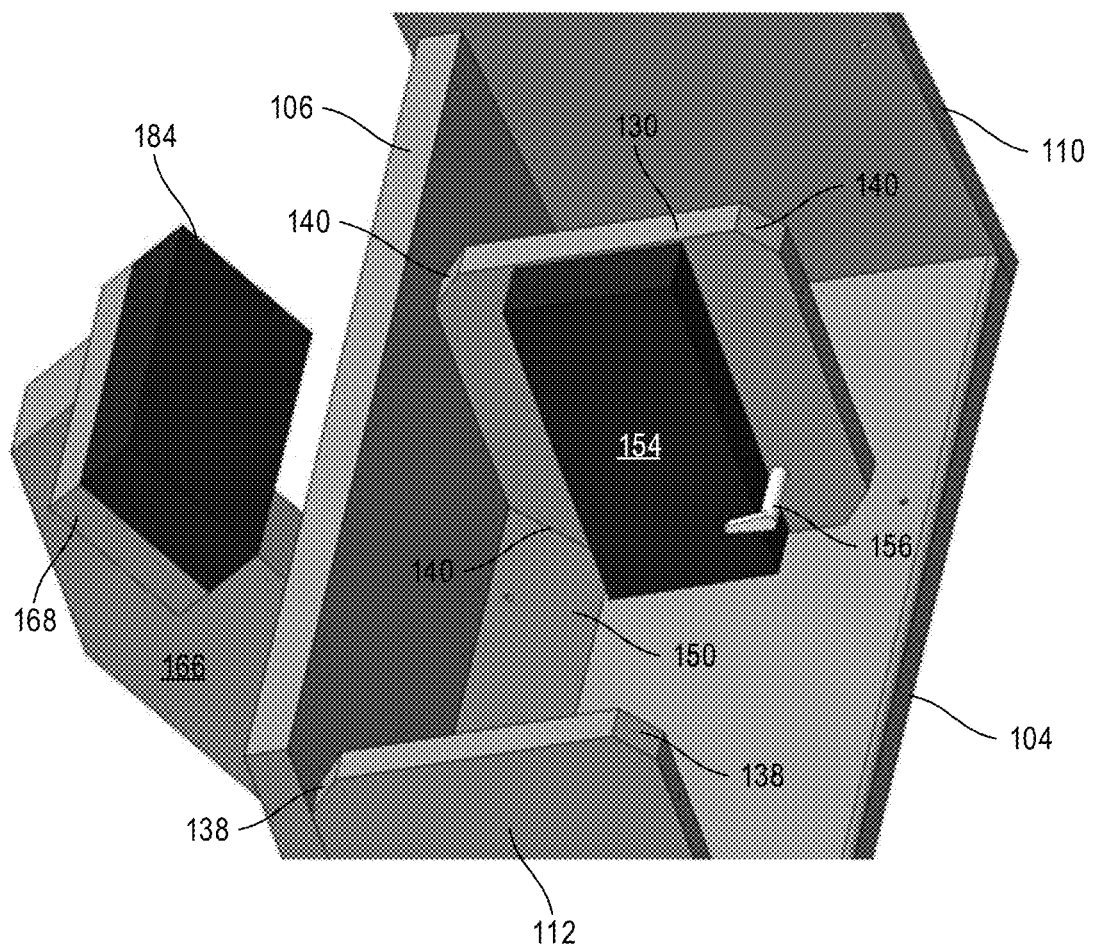
FIG. 15 is a view of the interior of the birdhouse wherein a camera retaining latch is in a locked position in accordance with an exemplary embodiment.

The birdhouse 100 also includes a channel wall 150. The channel wall 150 extends horizontally between and is connected to (or held in position up against) the rear wall 104 and the left-side wall 106 at about a 45° angle. The channel wall 150 also extends vertically between and perpendicular to the bottom wall 112 and the camera platform 130. With reference to FIG. 13, the rear wall 104, the left-side wall 106, and the channel wall 150 define a void (hereinafter referred to as a "channel") 152 that extends vertically between the bottom wall 112 and the camera platform 130. Furthermore, the channel wall 150 is aligned with a beveled corner of the bottom wall 112 and is aligned with a beveled corner of the camera platform 130 and as such, the channel 152 is in open communication with the wiring chamber 134 and the external environment. The wiring channel wall 150 need not be beveled. In some embodiments, the wiring channel wall 150 may be rectangular.

Figure 16:
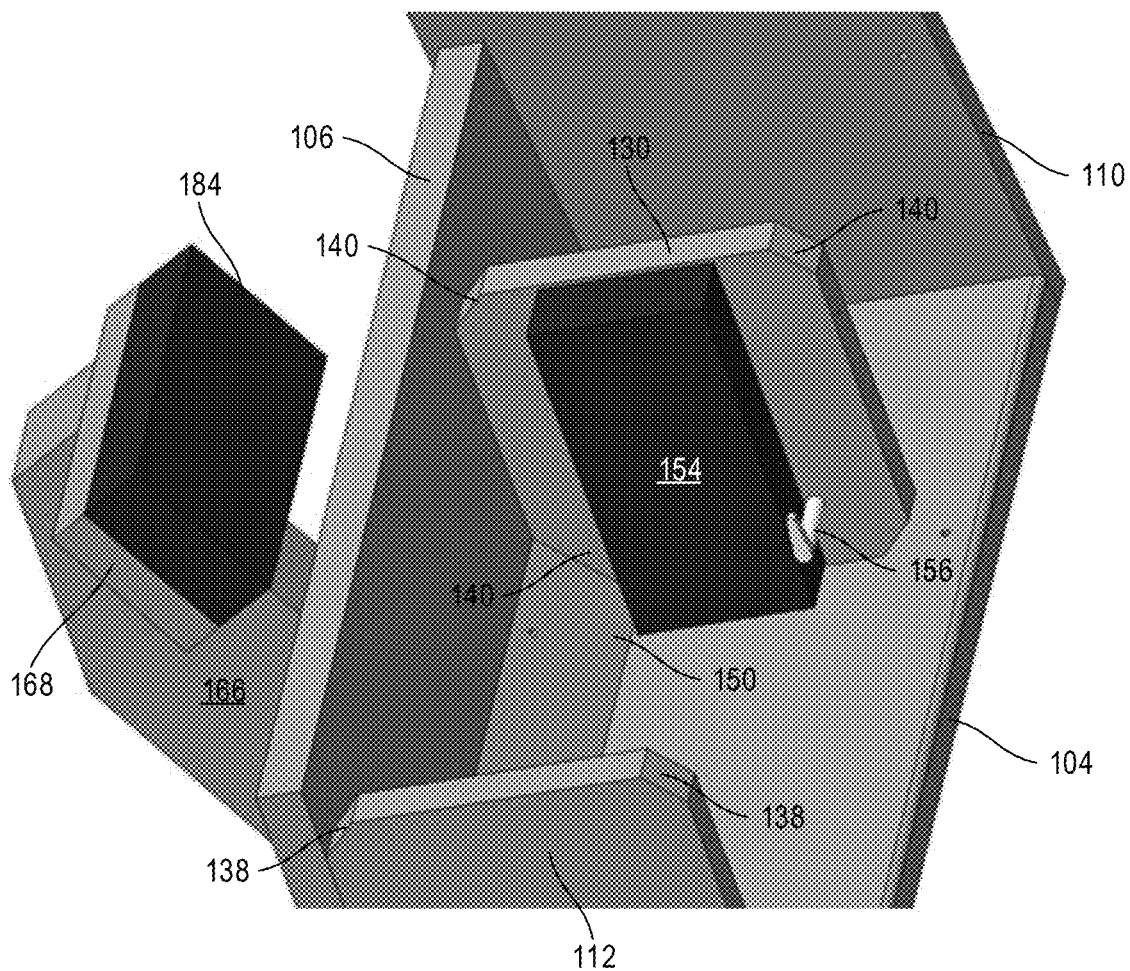
FIG. 16, is a view of the interior of the birdhouse wherein the camera retaining latch is in an unlocked position in accordance with an exemplary embodiment.

The birdhouse 100 further includes a camera 154 disposed within the inner volume 128. The camera 154 may include, but is not limited to, a webcam. In one embodiment (FIG. 14), the camera 154 is disposed within the wiring chamber 134 and is positioned vertically above the camera platform 130. In this embodiment, the camera 154 may be mounted to the camera platform 130 (e.g., via one or more screws) such that a lens of the camera 154 is vertically above or extending through the aperture 136 thereby allowing the camera 154 to capture an image of the nest chamber 132. In another embodiment (FIGS. 12 and 15-17), the camera 154 is disposed within the nest chamber and is positioned vertically below camera platform 130. In this embodiment, the camera 154 may be mounted to the camera platform 130 via a rotatable latch 156 and a mount (e.g., a bracket) that is connected to the camera platform 130. The latch 156 is configured to rotate 90° between a locked position (FIG. 15) and an unlocked position (FIG. 16). When the latch 156 is in the locked position, the latch 156 retains the camera 154 between the latch 156 and the camera platform 130. When the latch 156 is in the unlocked position, the camera 154 may be removed from the birdhouse 100. In some embodiments the camera 154 may be slidably and removably mounted to the camera platform 130. As such, the camera 154 may be removed from the birdhouse 100 for maintenance. While the figures depict the latch 156 as retaining the camera 154 in position, other means for retaining the camera 154 may be employed (e.g., brace, strap, screw, slidable panel connected to the camera 154, etc.).

The camera platform 130 may be shaped and sized based on the size and shape of the camera 154. Furthermore, the camera platform 130 may be removably connected to the walls 104, 106, and 108. As such, a first camera platform 130 that accommodates a first camera 154 may be removed from the birdhouse 100 and replaced with a second different camera platform 130 that accommodates a second different camera 154.

A lens of a camera may resemble an eye of a predator and as such, may alarm birds nesting within the nest chamber 132. In order to camouflage the camera lens, both the body of the camera 154 and a bottom surface (e.g., the surface facing the nest chamber 132) of the camera platform 130 may be colored black. As such, a black lens of the camera 154 blends in with the body of the camera 154 and the bottom surface of the camera platform 130.

In some embodiments, the camera 154 may require a connection to an external power source (e.g., an outlet located behind the birdhouse 100). In these embodiments, wiring may extend from the camera 154 and enter the channel 152 via an opening created by a beveled corner 140. When the camera 154 is positioned vertically below the camera platform 130, the wiring extends through the aperture 136 and then enters the channel 152. The wiring may then extend through the channel 152 and may exit the birdhouse 100 via an opening created by a beveled corner 138 thereby allowing the wiring to connect to an external power source. While the corners of the bottom wall 112 and the camera platform 130 are depicted as beveled corners 138 and 140 respectively, the corners of the bottom wall 112 and the camera platform 130 may have any shape (e.g., rectangular, rounded, etc.) so long as the corners of the bottom wall 112 define openings between the nest chamber 132 and the external environment and the corners of the camera platform 130 define openings between the nest chamber 132 and the wiring chamber 134.

In other embodiments, wiring connected to an external power source (e.g., an extension cord connected to an external power outlet) may enter the channel 152 via an opening defined by the beveled corner 138. The wiring may then extend through the channel 152 and may enter the wiring chamber 134 via an opening defined by the beveled corner 140 and may provide an AC outlet within the wiring chamber 134. In this embodiment, power wiring associated with the camera 154 enters the wiring chamber via the aperture 136 and connects to the AC outlet thereby powering the camera 154.

Since the wiring associated with the camera 154 is retained in the wiring chamber 134 and retained within the channel 152, the wiring is protected from damage that may be caused by the birds as the wiring is inaccessible from within the nest chamber 132. This also protects birds that are within the birdhouse 100. If the wiring were to become exposed, birds may be harmed.

Figure 17:
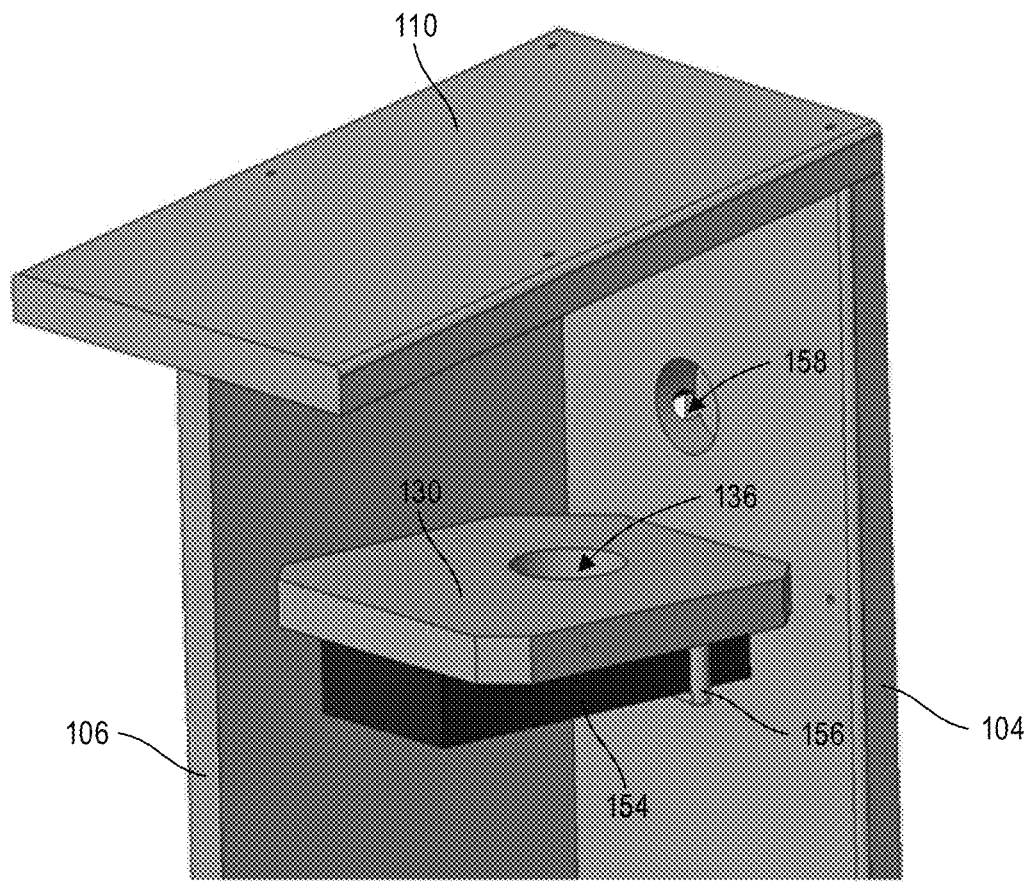
FIG. 17 is a view of the interior of a birdhouse wherein a rear wall has an opening for a wire in accordance with an exemplary embodiment.
Figure 18:
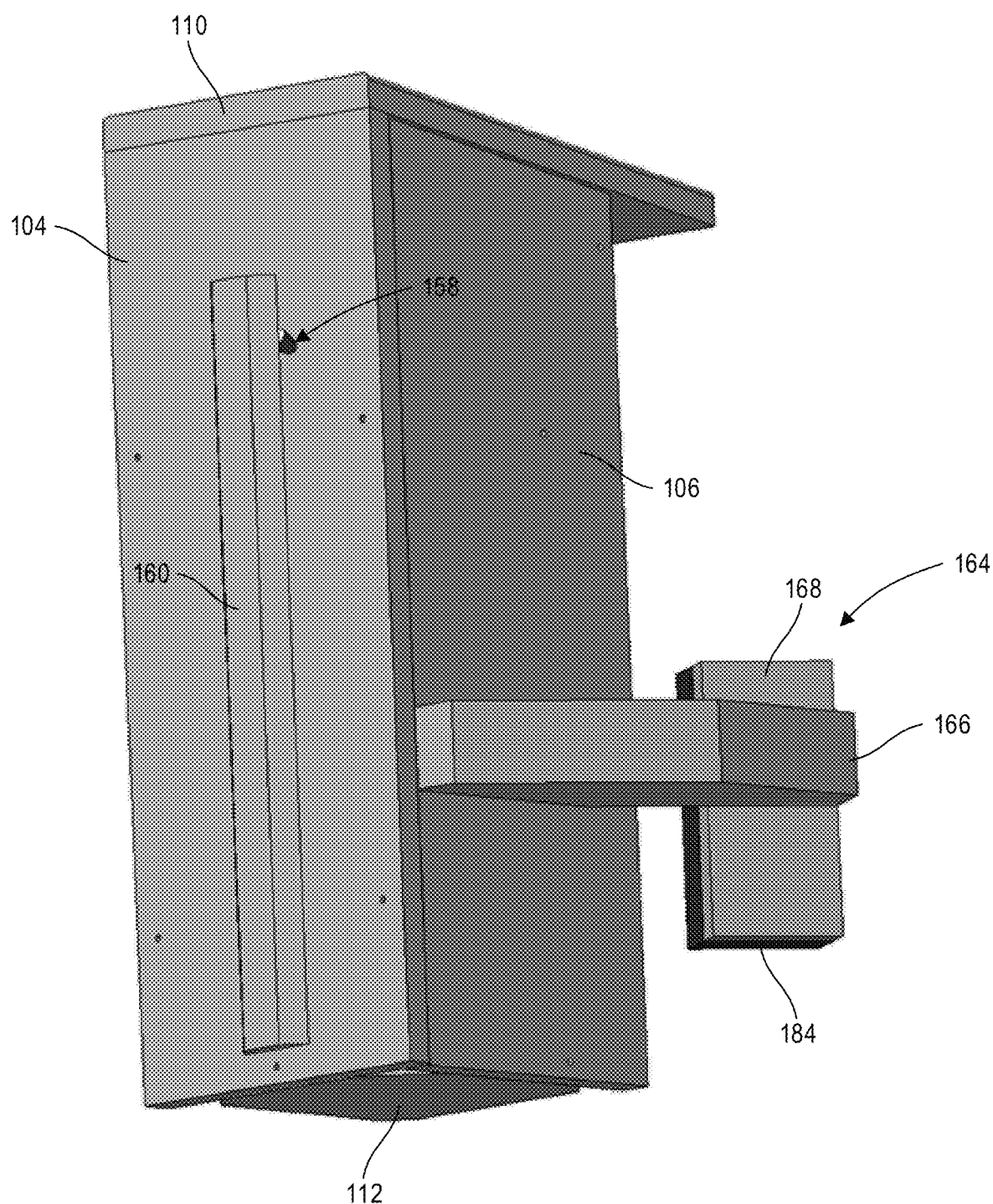
FIG. 18 is a rear view of a birdhouse wherein a rear wall has an opening for a wire in accordance with an exemplary embodiment.
Figure 19:
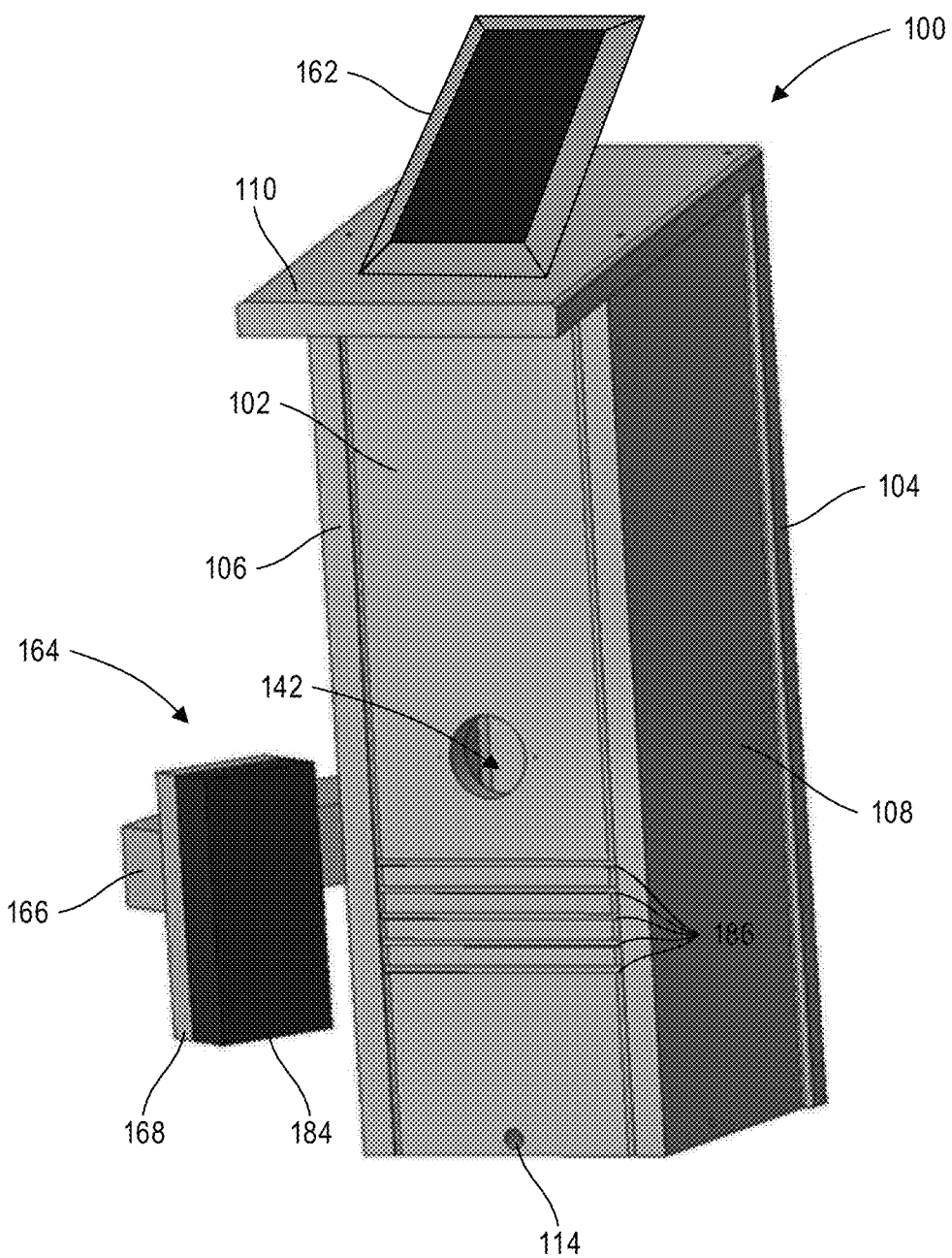
FIG. 19 depicts a birdhouse with a solar panel in accordance with an exemplary embodiment.
Figure 20:
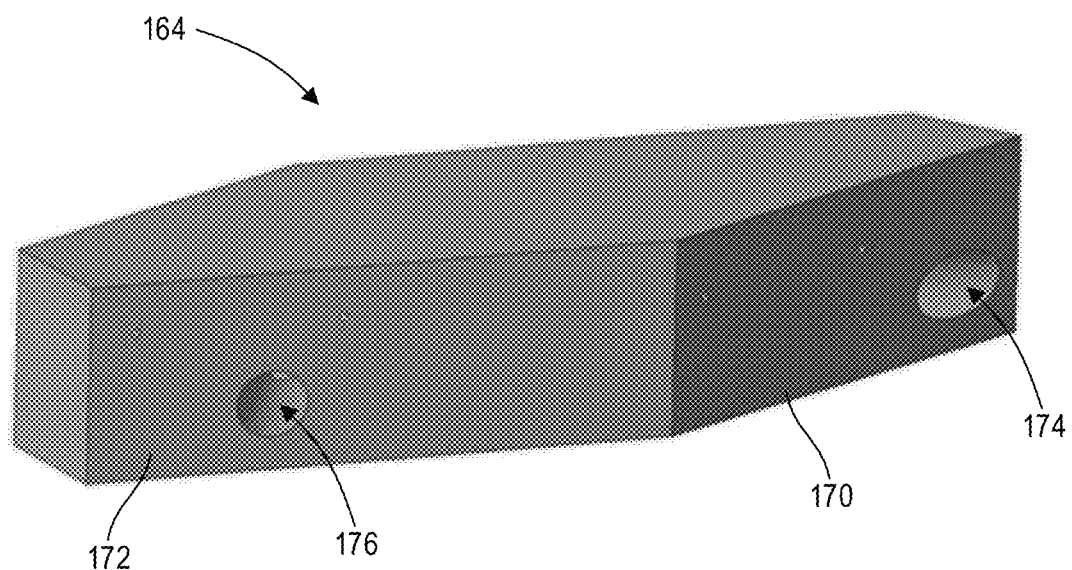
FIG. 20 depicts an arm of a camera support in accordance with an exemplary embodiment.
Figure 21:
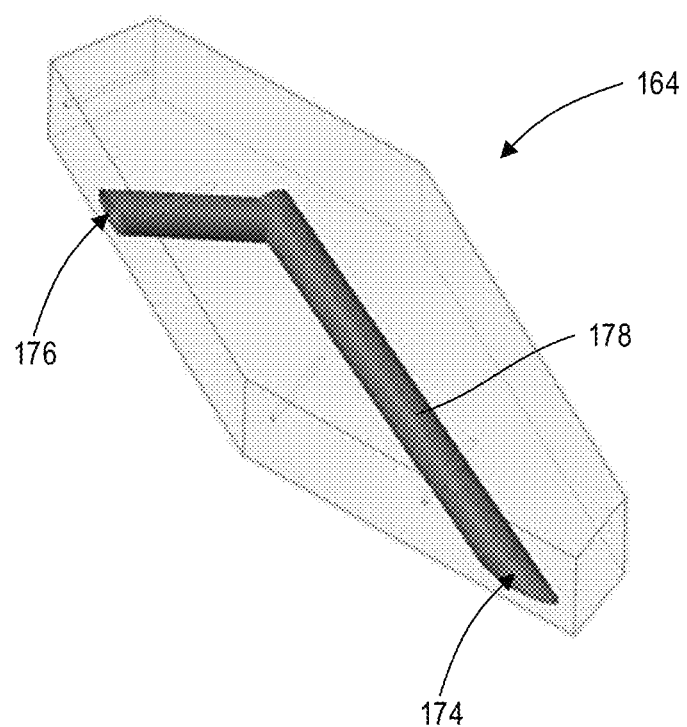
FIG. 21 depicts the interior of the arm of the camera support in accordance with an exemplary embodiment.
Figure 22:
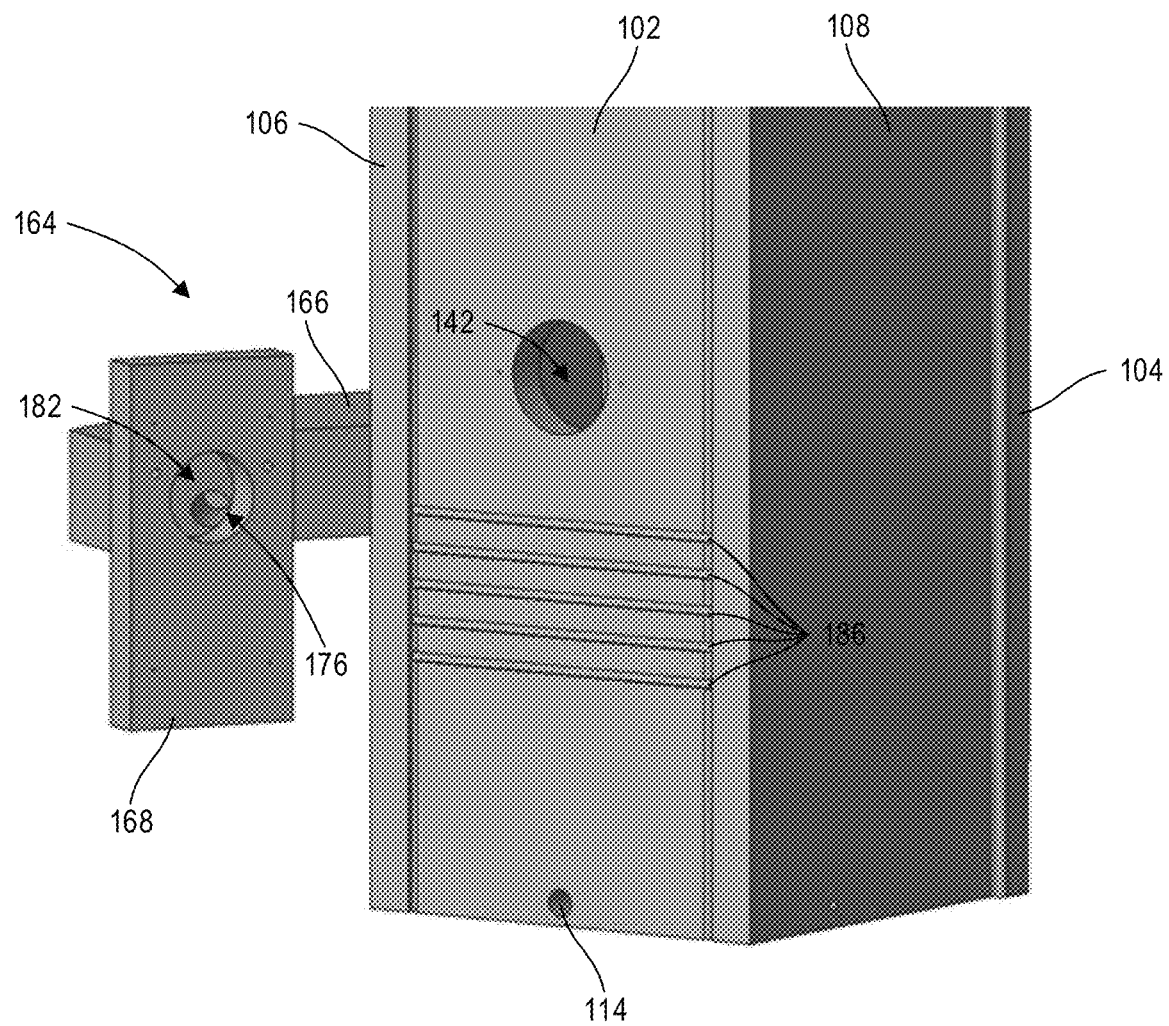
FIG. 22 depicts openings of a camera support arm in accordance with an exemplary embodiment.

Referring now to FIGS. 17 and 18, a variant of the birdhouse 100 is shown in accordance with an exemplary embodiment. In this embodiment, wiring associated with the camera 154 exits the rear of the birdhouse 100.

In this embodiment, the rear wall 104 includes an angled opening 158 and a panel 160. The opening 158 extends through the rear wall 104 and is angled downward to prevent the ingress of water into the wiring chamber 134. The panel 160 provides a gap between a surface to which the birdhouse 100 is mounted and the outer surface of the rear wall 104. The wiring may run within this gap without being compressed by the rear wall 104.

In some embodiments, the camera 154 may be battery powered and as such does not include wiring needed to power the camera 154. In these embodiments, a user may remove the camera as previously described herein or may remove the battery from the camera 154, charge the battery, and return the camera 154 to the birdhouse or return the battery to the camera 154. In embodiments wherein the camera 154 is battery powered, the birdhouse 100 may include a secondary battery disposed within the wiring chamber 134. In this embodiment, the secondary battery may be connected to and power the camera via wiring extending through the aperture 136.

In other embodiments, (FIG. 19), the birdhouse 100 may further include a solar panel 162 and a battery powered camera 154. In this embodiment, wiring associated with the camera exits the birdhouse 100 and couples to the solar panel 162. The solar panel 162 charges the camera battery thereby providing power to the camera 154 without a connection to an electrical outlet. The camera may be connected to the solar panel via wiring that extends through the opening 158.

The birdhouse 100 further includes an external camera support 164. The camera support 164 includes an arm 166 and a camera platform 168.

The arm 166 is connected to and extends between the left-side wall 106 and the camera platform 168 such that the arm 166 is perpendicular to the left-side wall 106 and the camera platform 168. The arm 166 includes a first connection surface 170 and a second connection surface 172. The first connection surface 170 connects the arm 166 to the left-side wall 106 and the second connection surface 172 connects the arm 166 to the camera platform 168. The first connection surface 172 includes a first opening 174 and the second connection surface 172 includes a second opening 176. The arm 166 further includes a conduit 178 that extends between the first opening 174 and the second opening 176.

Figure 23:
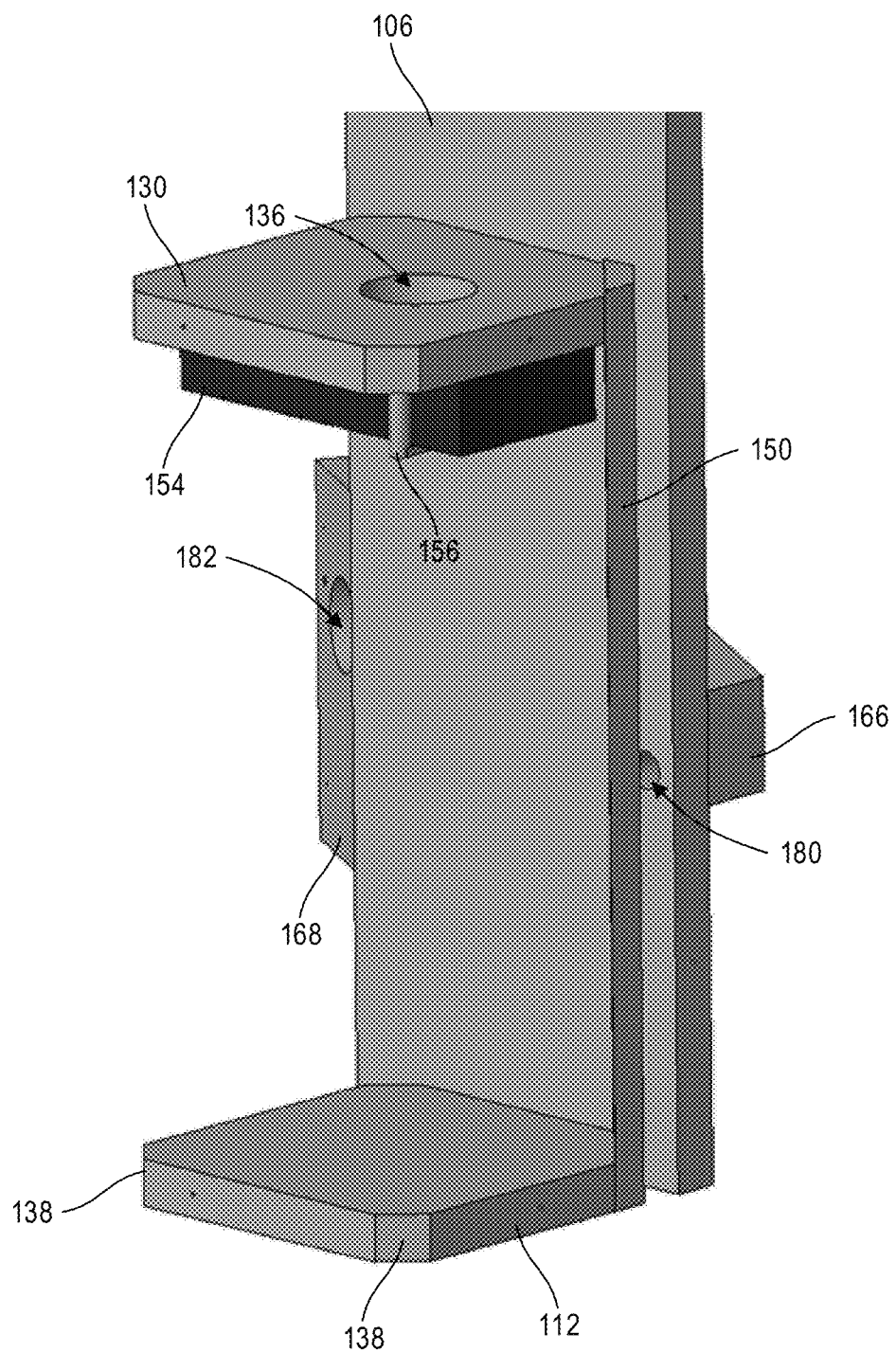
FIG. 23 depicts an opening of a side wall of a birdhouse in accordance with an exemplary embodiment.
Figure 24:
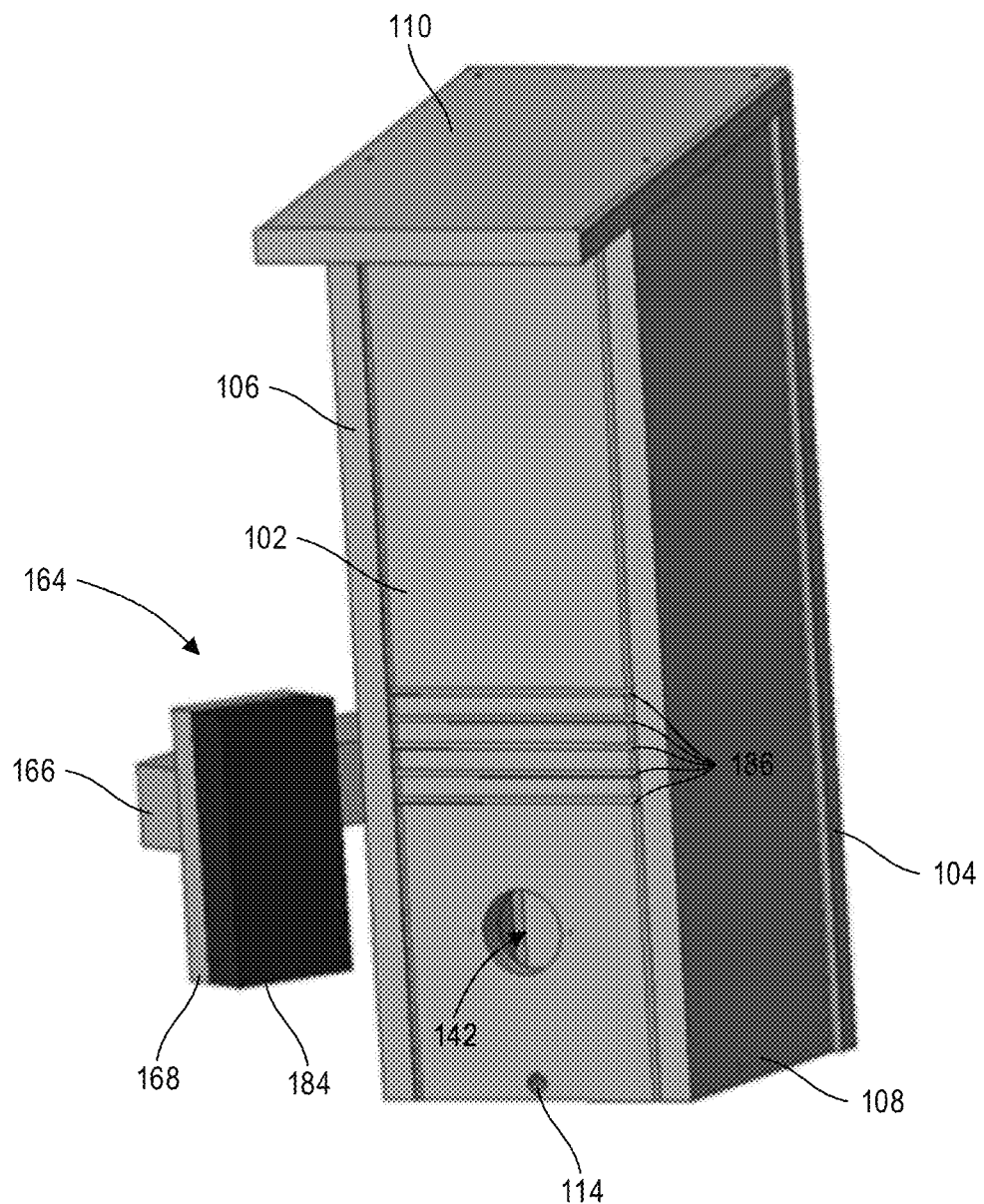
FIG. 24 depicts a birdhouse with a portal in a roosting position in accordance with an exemplary embodiment.
Figure 25:
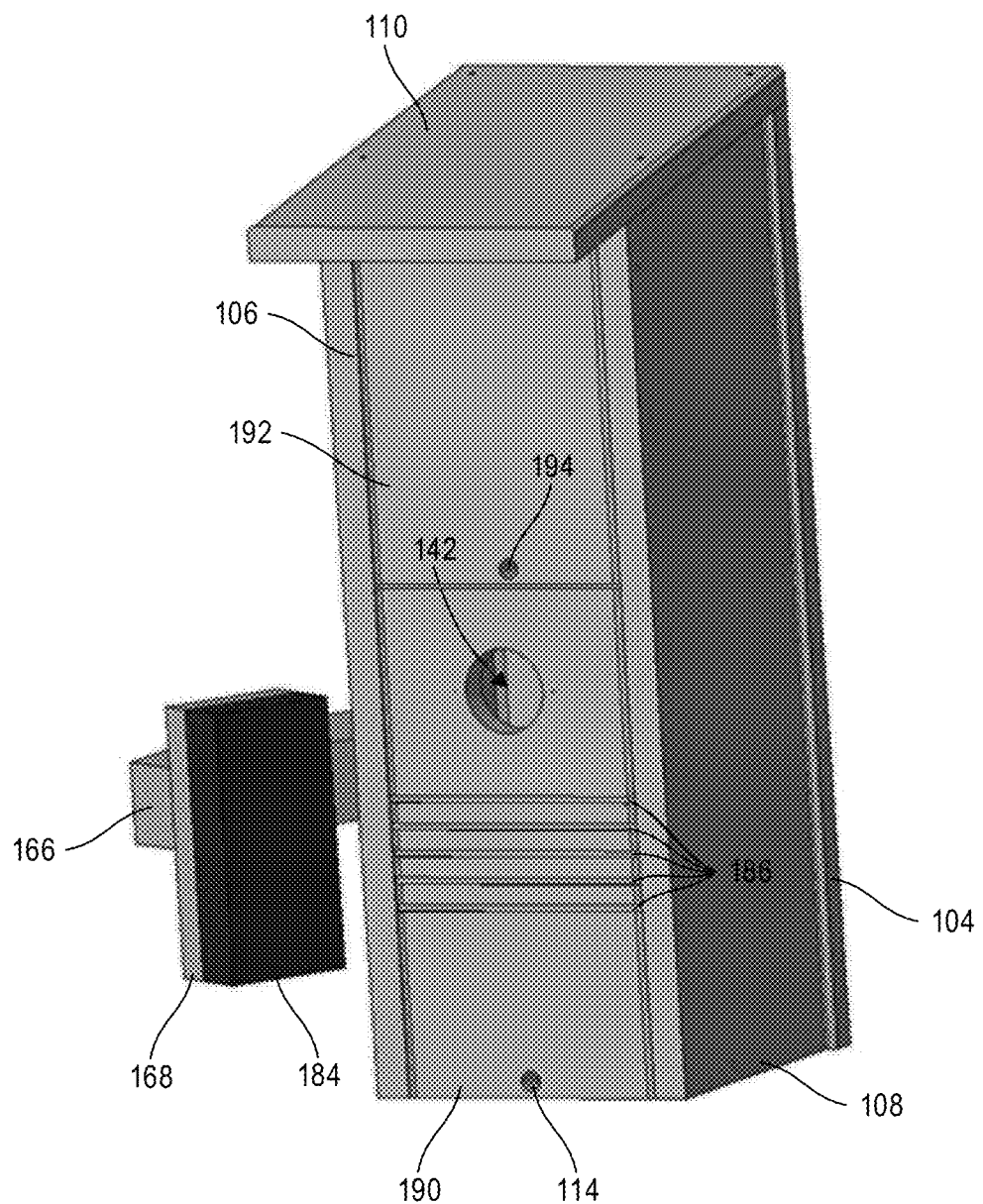
FIG. 25 depicts a birdhouse with a nest chamber door and a wiring chamber door in accordance with an exemplary embodiment.
Figure 26:
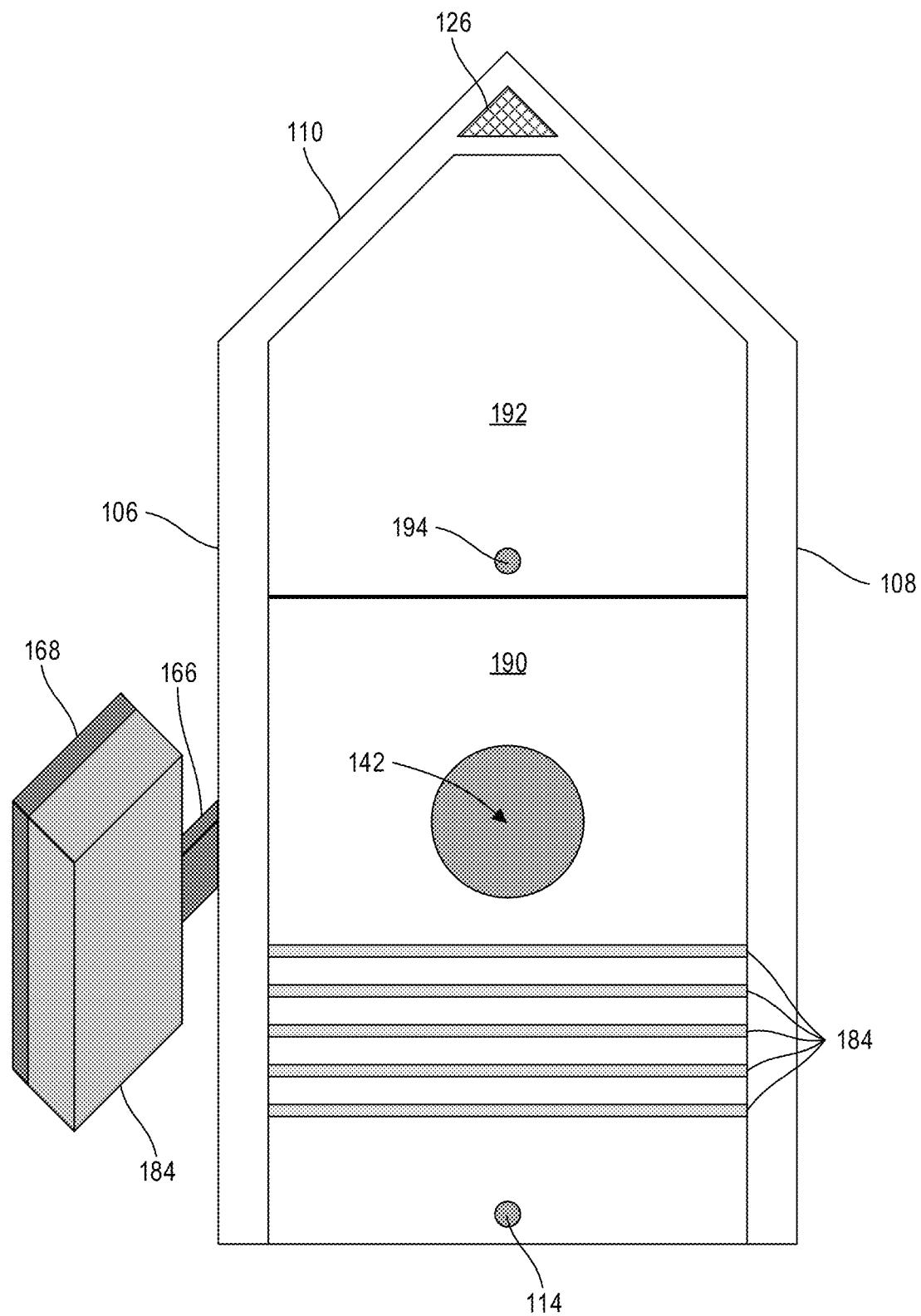
FIG. 26 schematically depicts a birdhouse with an apexed roof, a nest chamber door and a wiring chamber door in accordance with an exemplary embodiment.

With particular reference to FIG. 23, the left-side wall 106 includes an opening 180 that extends through the left-side wall 106. The opening 180 is located towards the rear wall 104 and is in open communication with the channel 152. The arm 166 is connected to the left-side wall 106 such that the first opening 174 of the arm 166 and the opening 180 of the left-side wall 106 align. The conduit 178, and therefore the second opening 176, are in open communication with the channel 152.

The camera platform 168 includes an opening 182 that extends through the camera platform 168. When the camera platform 168 is connected to the arm 166, the opening 182 of the camera platform 168 is in open communication with the second opening 176 of the arm 166. As such, the opening 182 of the camera platform is in open communication with the channel 152 via the conduit 178.

A camera 184 may be mounted to the camera platform 168. The camera 184 is configured to capture an image of an area in front of the portal 142. As such, the camera 184 may capture an image of a bird (or other animal) entering and exiting the birdhouse 100. While the camera 184 is depicted as vertically below the portal 142, in other embodiments, the camera support 164 and therefore the camera 184 may be positioned vertically above the portal 142. The camera 184 is positioned such that the camera 184 captures an image (or video) of the portal 142 and a surrounding area.

The camera platform 168 may be shaped and sized based on the size and shape of the camera 184. Furthermore, the camera platform 168 may be removably connected to the arm 166. As such, a first camera platform 168 that accommodates a first camera 184 may be removed from the arm 166 and replaced with a second different camera platform 168 that accommodates a second different camera 184.

The camera 184 may require a connection to a power source (e.g., an electrical outlet). In these embodiments, wiring extends from the camera 184 and enters the conduit 178 via the opening 182 of the camera platform 168 and the second opening 176 of the arm 166. The wiring may then extend through the conduit 178, exit the conduit 178 via the first opening 174 and enter the channel 152 via opening 180 of the left-side wall 106. The wiring may then extend through the channel 152 and may exit the birdhouse 100 via an opening created by a beveled corner 138 thereby allowing the wiring to connect to an external power source.

As previously discussed herein, wiring connected to an external power source extend through the channel 152 and may enter the wiring chamber 134 thereby providing an AC outlet within the wiring chamber 134. In this embodiment, wiring extends from camera 184 enters the channel 152 as previously discussed herein extends through the channel 152 and enters the wiring chamber via an opening defined by a beveled corner 140. The wiring connected to the camera 184 may then connect to the AC outlet within the wiring chamber 134.

Since the wiring associated with the camera 184 is retained in the conduit 178 and the channel 152, the wiring is protected from damage that may be caused by the external environment and birds as the wiring is inaccessible from the external environment and is inaccessible from within the nest chamber 132. The birds are also protected by preventing them from interacting with the wiring.

In some embodiments, the camera 184 may be battery powered and as such does not include wiring needed to power the camera 184. In these embodiments, a user may remove the camera from the camera platform 168 or may remove the battery from the camera 184, charge the battery, and return the camera 184 to the camera platform 168 or return the battery to the camera 184. As previously discussed herein, the birdhouse 100 may include a secondary battery disposed within the wiring chamber 134. In these embodiments, wiring connected to the camera 184 may extend into the wiring chamber 134 as previously discussed herein and connect to the secondary battery.

In other embodiments, wherein the camera 184 and the birdhouse 100 includes the solar panel 162, wiring associated with the camera 184 exits the birdhouse 100 via the conduit 178 and the channel 152 as previously discussed herein, and couples to the solar panel 162. The solar panel 162 charges the camera battery thereby providing power to the camera 184.

The birdhouse 100 may include features conducive to bird nesting and/or roosting. For example, the front wall 102 includes exterior perching grooves 186 and interior perching grooves 188. The perching grooves 186 and 188 provide a grip for birds to perch while using the birdhouse 100. The interior perching grooves 188 may be spaced at a predetermined distance (e.g., 1", 1.5", 2", or 1 cm, 3 cm, 5 cm, etc.) to provide a marker for tracking nest height over time. That is, as a nest is developed, the nest may surpass a perching groove 188 thereby indicating the size of the nest. While the front wall 102 is depicted as including the perching grooves 188, in other embodiments, the rear wall 104, the left-side wall 106, and/or the right-side wall 108 may include perching grooves 188 spaced apart at a predetermined distance to provide a marker for tracking a nest height.

In some embodiments (FIG. 24) the portal 142 may be vertically below the perching grooves 186 and 188 and closer to the bottom wall 112 (e.g., by inverting the front wall 102 (or a nest chamber door 190) or by replacing the front wall 102 (or a nest chamber door 190) with a different second wall/door configured for roosting). Placing the portal 142 closer to the bottom wall 112 provides an environment more conducive to roosting within the nest chamber 132 and as such, in this embodiment, the nest chamber 132 may be referred to as a "roosting chamber." For example, in this embodiment, when a bird perches on the perching grooves 188, the bird is located higher within the nest chamber 132 than a bird in a nest on the bottom wall 112. Heat rises within the nest chamber 132 and as such, a bird located higher up above the portal 142 within the nest chamber 132 may be more likely to roost in the birdhouse 100 as the perching grooves 188 are located in a warmer environment.

In some embodiments, rather than including a single front wall 102 that provides access to both the nest chamber 132 and the wiring chamber 134, the birdhouse 100 may include a nest chamber door 190 and a separate wiring chamber door 192. Providing a two-door birdhouse 100 may allow a user to access the wiring chamber 134 without disturbing a nest in the nest chamber 132

The nest chamber door includes the portal 142, the perching grooves 186 and 188 and the latch 114 as previously described herein with respect to the front wall 102 and the wiring chamber door 192 may include a latch 194. In these embodiments, the top end of the nest chamber door 190 and the wiring chamber door 192 may be connected (or hinged) to the left-side wall 106 and the right-side wall 108 such that the nest chamber door 190 and the wiring chamber door 192 pivot upwards to an open position. In other embodiments, the nest chamber door 190 and the wiring chamber door 192 may be removably coupled to the left-side wall 106 and the right-side wall 108 via any manner of connection (e.g., via tongue and groove fit, a ball and socket pressure mount, etc.) and may be removed to provide access to the nest chamber 132 and the wiring chamber 134 respectively. In some embodiments, the doors 190 and 192 may be removed from the birdhouse 100 by pulling the doors 190 and 192 away from the birdhouse 100 and may be reconnected to the birdhouse 100 by pushing the doors 190 and 192 into the birdhouse 100 (e.g., when the doors 190 and 192 are connected to the birdhouse via a ball and socket pressure mount). The nest chamber door 190 is dimensioned such that only the nest chamber 132 is accessible when the nest chamber door 190 is open or removed and the wiring chamber door 192 is dimensioned such that only the wiring chamber 134 is accessible when the wiring chamber door 192 is open or removed.

As previously discussed herein, in certain embodiments, the latch 114 is configured to move between a locked and unlocked position. When the latch 114 is in the locked position and the nest chamber door 190 is closed, the latch 114 couples to the bottom wall 112 and prevents a user (or animal) from opening or removing the nest chamber door 190. When the latch 114 is rotated to the unlocked position, the latch 114 decouples from the bottom wall 112 which allows a user to open or remove the nest chamber door 190. Like the latch 114, the latch 194 is also configured to move between a locked and unlocked position. When the latch 194 is in the locked position and the nest chamber door is closed, the latch 114 couples to the camera platform 130 and prevents a user from opening or removing the wiring chamber door 192. When the latch 194 is rotated to the unlocked position, the latch 194 decouples from the camera platform 130 which allows a user to open or remove the wiring chamber door 192.

The size of the nest chamber 132 may be adjusted. Providing a larger or smaller nest chamber 132 may attract different species of birds as different species of birds may prefer a larger or smaller nest chamber 132. Furthermore, providing a smaller nest chamber 132 may promote roosting as a smaller nest chamber 132 may create a warmer environment. Furthermore, it may be necessary to provide a larger nest chamber in order to accommodate a larger camera 154.

In one embodiment, the bottom wall 112 may be removably connected to the rear wall 104, the left-side wall 106, and the right-side wall 108 (e.g., via a tongue and groove fitting). In this embodiment, the rear wall 104, the left-side wall 106 and the right-side wall 108 may include a plurality of grooves at different heights for receiving the bottom wall 112. The bottom wall may be removed and received by a groove at a different height thereby increasing or decreasing the vertical size of the nest chamber 132 and/or wiring chamber 134 as desired.

Figure 27:
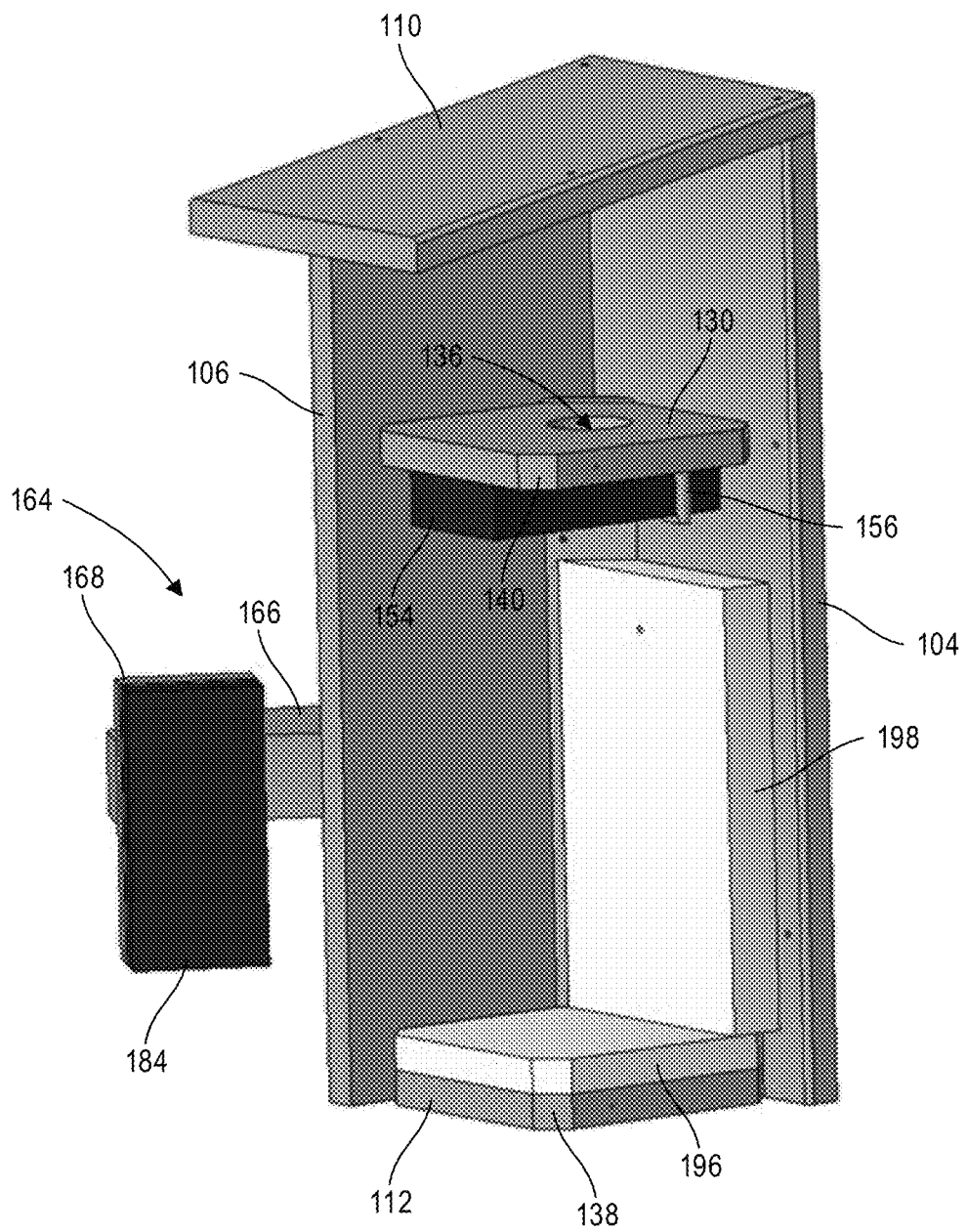
FIG. 27 depicts an interior of a birdhouse with additional plates in accordance with an exemplary embodiment.
Figure 28:
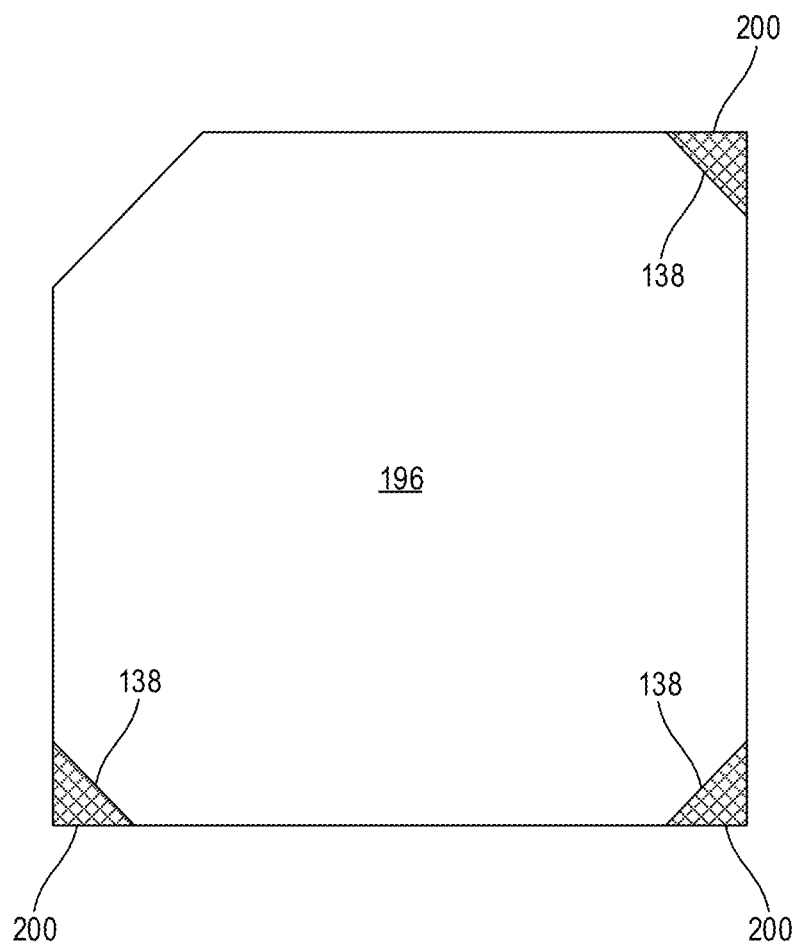
FIG. 28 depicts a floor plate of a birdhouse with mesh covers in accordance with an exemplary embodiment.

In another embodiment (FIG. 27), a nest chamber height adjusting floor plate 196 and/or one or more wall plates 198 may be added to the nest chamber 132 to reduce the size of the nest chamber 132. The nest chamber height adjusting floor plate 196 may rest on or be connected to the bottom wall 112. The wall plate(s) 198 may be connected to the rear wall 104, the left-side wall 106 or the right-side wall 108. While FIG. 27 depicts the birdhouse 100 as including one wall plate 198, in other embodiments, the birdhouse 100 may include two or three wall plates 198 each connected to one of the rear wall 104, the left-side wall 106, and/or the right-side wall 108. The nest chamber height adjusting floor plate 196 and the wall plate 198 may include beveled corners. When the birdhouse 100 includes the nest chamber height adjusting floor plate 196 and the wall plate 198, the nest chamber height adjusting floor plate 196 and the wall plate 198 do not cover the openings created by the beveled corners 138 of the bottom wall 112 or the camera platform 130. In another embodiment, changing the vertical height of the bottom wall 112 via a tongue and groove method (or other method) serves the same purpose as the insertion of the nest chamber height adjusting floor plate 196.

In one embodiment (FIG. 28), a nest chamber height adjusting floor plate 196 may include a mesh covering 200. While the mesh covering 200 covers the openings created by the beveled corners 138 of the bottom wall 112, air may still flow between the external environment and the nest chamber 132. In one embodiment, the bottom wall 112 may also contain a mesh covering that covers opening created by the beveled corners 138.

The size of the wiring chamber 134 may also be adjusted. It may be desirable to adjust the size of the wiring chamber in order to accommodate a different sized camera 154 that is disposed within the wiring chamber 134. In one embodiment, the camera platform 130 may be removably connected to the rear wall 104, the left-side wall 106, and the right-side wall 108 (e.g., via a tongue and groove fitting). In this embodiment, the rear wall 104, the left-side wall 106 and the right-side wall 108 may include a plurality of grooves at different heights for receiving the camera platform 130. The camera platform 130 may be removed and received by a groove at a different height thereby increasing or decreasing the size of the camera chamber 134 as desired.

It may also be desirable to provide a warmer nest chamber environment in order to promote roosting (e.g., during colder months in which additional warmth will not harm, but would rather benefit birds). In order to create a warmer environment, the openings created by the beveled corners 138 and 140 may be covered or plugged thereby preventing warm air from escaping the birdhouse 100 via the openings.

Figure 29:
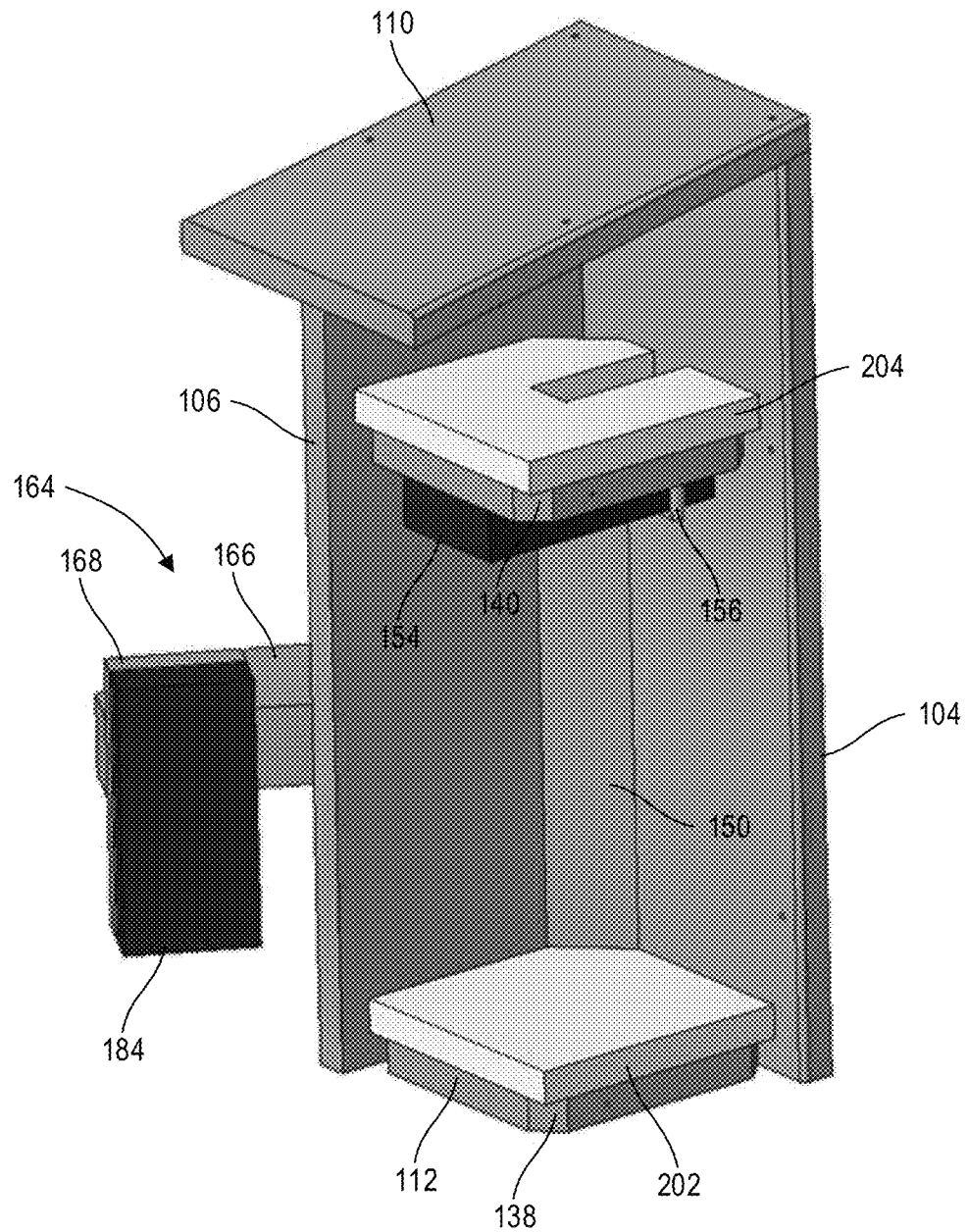
FIG. 29 depicts an interior of a birdhouse with insulating plates in accordance with an exemplary embodiment.

In some embodiments (FIG. 29), an insulating nest chamber floor plate 202 and an insulating wiring chamber floor plate 204 may be added to the nest chamber 132 and the wiring chamber 134 respectively. The insulating nest chamber floor plate 202 rests upon the bottom wall 112 and the insulating wiring chamber floor plate 204 rests upon the camera platform 130. Unlike the bottom wall 112 and the camera platform 130, the insulating nest chamber floor plate 202 and the insulating wiring chamber floor plate 204 do not include beveled corners. As such, the openings created by the beveled corners 138 and 140 are covered by the insulating floor plates 202 and the 204 respectively. While FIG. 29 depicts the insulating floor plates 202 and 204 as covering the openings created by the beveled corners 138 and 140, in other embodiments other means for covering these openings may be employed. In one example, the birdhouse 100 may include plugs that are inserted into the openings created by the beveled corners 138 and 140. In another example, the birdhouse 100 may include slidable or rotatable vertical or horizontal sliders that cover the openings created by the beveled corners 138 and 140. Sliders may be also small, discrete means of covering individual openings in the bottom wall 112 and the camera platform 130. These sliders are connected to the surface of the camera platform 130, bottom wall 112, or the side walls 106 and 108 and slide or rotate into position to cover the openings.

Various elements of the birdhouse 100 (e.g., the walls 102-112) may be formed from various types of wood. In some embodiments, the exterior of the birdhouse 100 may be formed from molded plastic. While the exterior may be formed from plastic, the interior may in some embodiments be formed from wood in order to provide a more natural nesting environment.

Figure 30:
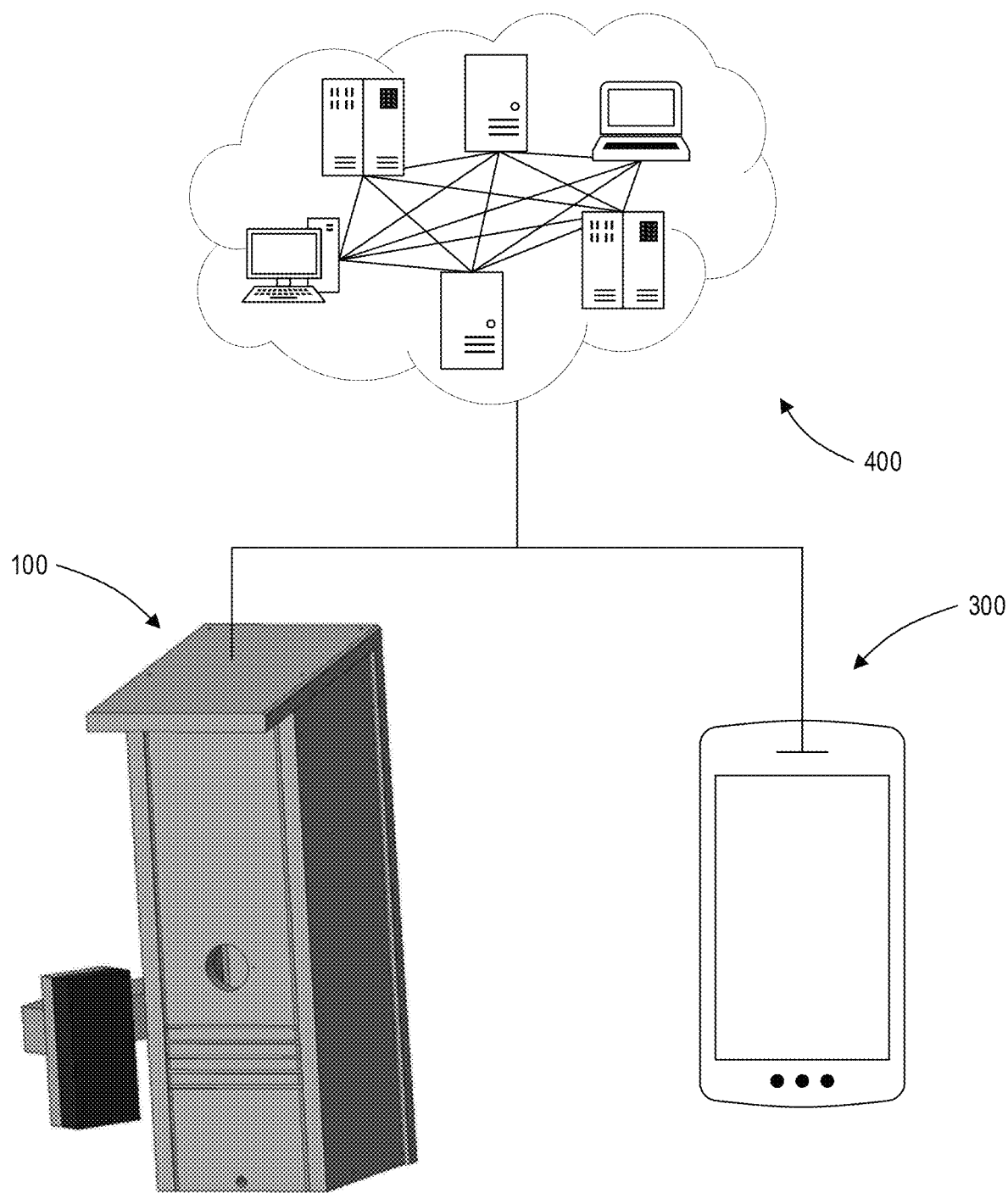
FIG. 30 depicts a system wherein a cloud computing environment is in communication with a smartphone and with cameras of the birdhouse in accordance with an exemplary embodiment.
Figure 31:
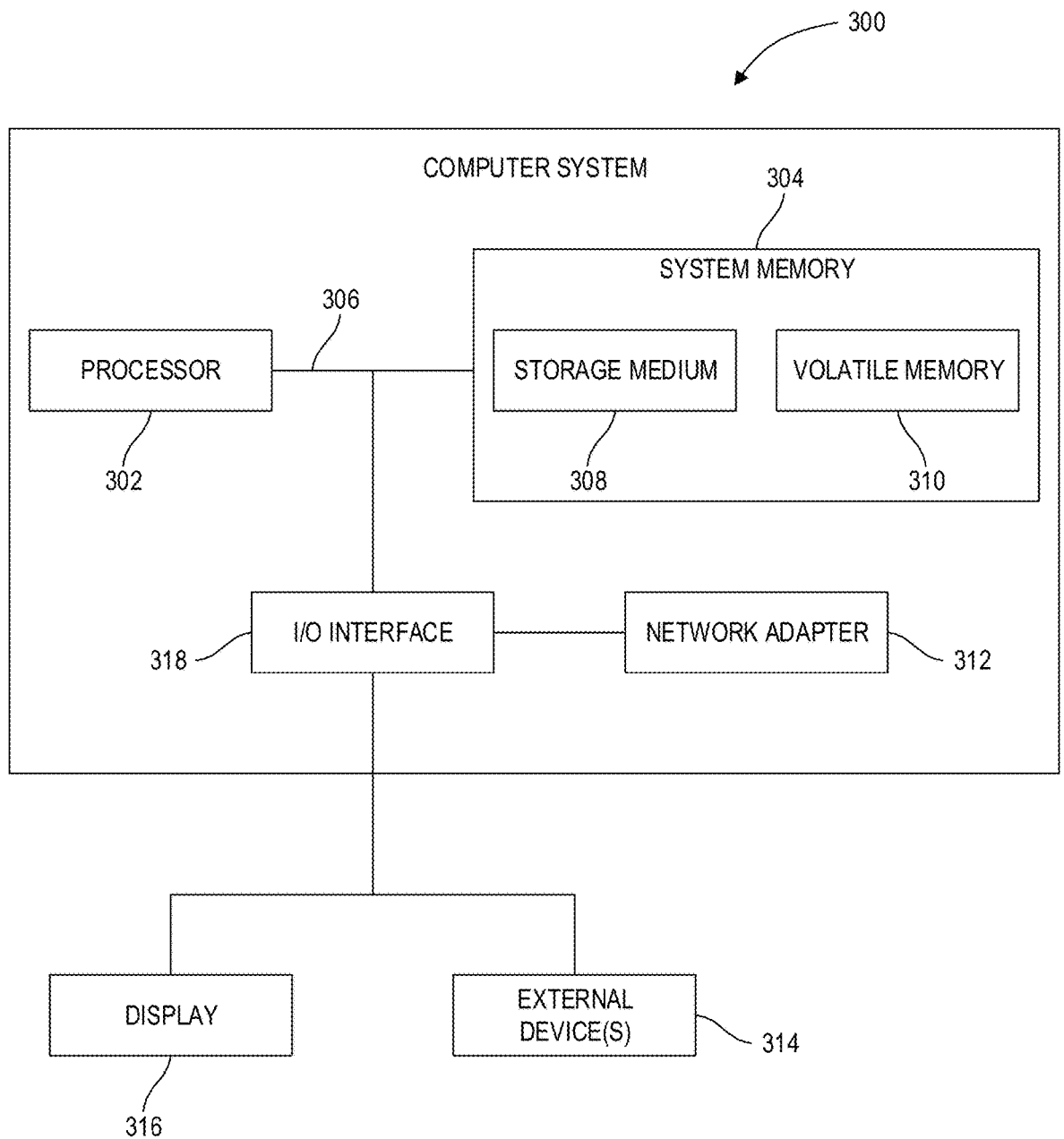
FIG. 31 schematically illustrates a computer system in accordance with an exemplary embodiment.

Referring now to FIGS. 30 and 31 a system for monitoring birds is shown in accordance with an exemplary embodiment. The system includes the birdhouse 100, a computer system 300, and a cloud computing environment 400. A computer system (or device) is any system/device capable of receiving, processing, and/or sending data. Examples of computer systems include, but are not limited to personal computers, servers, hand-held computer devices, tablets, smart phones, multiprocessor-based systems, mainframe computer systems, and distributed cloud computing environments that include any of the above systems and the like. While the computer system 300 is depicted as a smartphone, the computer system 300 may be any type of computer system (e.g., laptop, personal computer, server, etc.).

As shown in FIG. 31, the computer system 300 includes one or more processors or processing units 302, a system memory 304, and a bus 306 that couples various components of the computer system 300 including the system memory 304 to the processor 302.

The system memory 304 includes a computer readable storage medium 308 and volatile memory 310 (e.g., Random Access Memory, cache, etc.). As used herein, a computer readable storage medium includes any media that is capable of storing computer readable program instructions and is accessible by a computer system. The computer readable storage medium 308 includes non-volatile and non-transitory storage media (e.g., flash memory, read only memory (ROM), hard disk drives, etc.). Computer readable program instructions as described herein include program modules (e.g., routines, programs, objects, components, logic, data structures, etc.) that are executable by a processor. Furthermore, computer readable program instructions, when executed by a processor, can direct a computer system (e.g., the computer system 300) to function in a particular manner such that a computer readable storage medium (e.g., the computer readable storage medium 308) comprises an article of manufacture.

The bus 306 may be one or more of any type of bus structure capable of transmitting data between components of the computer system 300 (e.g., a memory bus, a memory controller, a peripheral bus, an accelerated graphics port, etc.).

In some embodiments, as depicted in FIG. 31, the computer system 300 may include one or more external devices 314 and a display 316. As used herein, an external device includes any device that allows a user to interact with a computer system (e.g., mouse, keyboard, touch screen, etc.). An external device 314 and the display 316 in communication with the processor 302 and the system memory 304 via an Input/Output (I/O) interface 318.

The display 316 may display a graphical user interface (GUI) that may include a plurality of selectable icons and/or editable fields. A user may use an external device 314 (e.g., a mouse) to select one or more icons and/or edit one or more editable fields. Selecting an icon and/or editing a field may cause the processor 302 to execute computer readable program instructions stored in the computer readable storage medium 308.

The computer system 300 may further include a network adapter 312 which allows the computer system 300 to communicate with one or more other computer systems/devices via one or more networks (e.g., a local area network (LAN), a wide area network (WAN), a public network (the internet), etc.). The camera 154, the camera 184, the computer system 300, and the cloud computing environment 400 are connected to and in communication with one another when the camera 154, the camera 184, the computer system 300, and the cloud computing environment 400 are connected to a same network (e.g., the internet).

In some embodiments, a node 404 of the cloud computing environment 400 is connected to and receives a video stream from the camera 154 and/or the camera 184 and may save the video within a computer readable storage medium. A user of a computer system 300 may access and play the video stored in the node 404 via an app stored locally on the computer system 300 or may access the video via an internet browser. In some embodiments the video may be a live stream and a user of the computer system 300 may access the live stream to view a real-time video of the birdhouse 100. In other embodiments, the computer system 300 may directly connect to and receive a live stream from the camera 154 and/or the camera 184.

Figure 32:
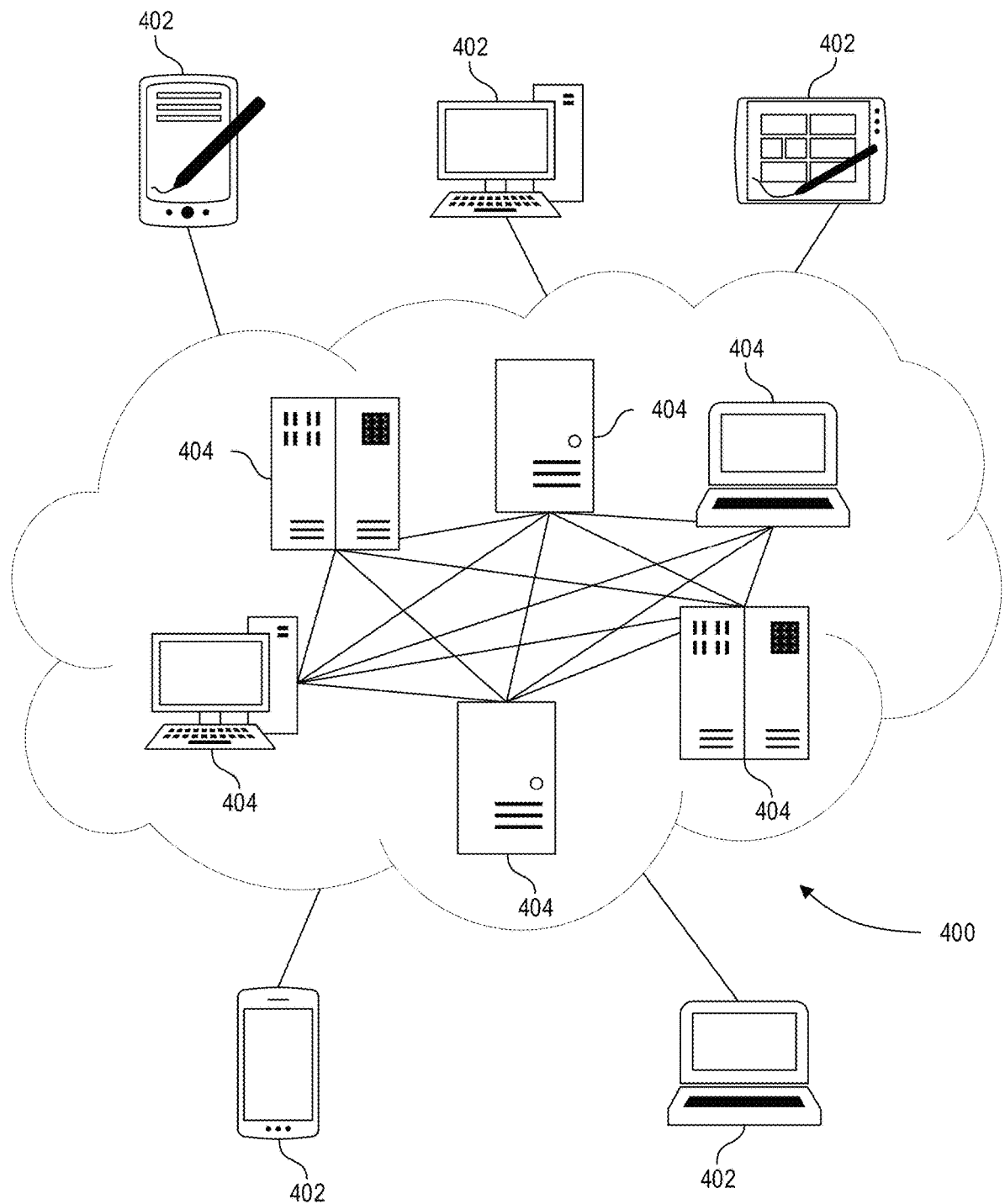
FIG. 32 schematically illustrates a cloud computing environment in accordance with an exemplary embodiment.

With reference to FIG. 32, the cloud computing environment 400 connected to one or more user computer systems 402 is depicted in accordance with an exemplary embodiment. The cloud computing environment 400 provides network access to shared computer resources (e.g., storage, memory, applications, virtual machines, etc.) to the one or more user computer systems 402. In one embodiment, the computer system 300 is a user computer system 402 that is connected to the cloud computing environment 400. As depicted in FIG. 32, the cloud computing environment 400 includes one or more interconnected nodes 404. Each node may be a computer system or device with local processing and storage capabilities. The nodes 404 may be grouped and in communication with one another via one or more networks. This allows the cloud computing environment 400 to offer software services to the one or more user computer systems 402 and as such, a user computer system 402 does not need to maintain resources locally.

Figure 33:
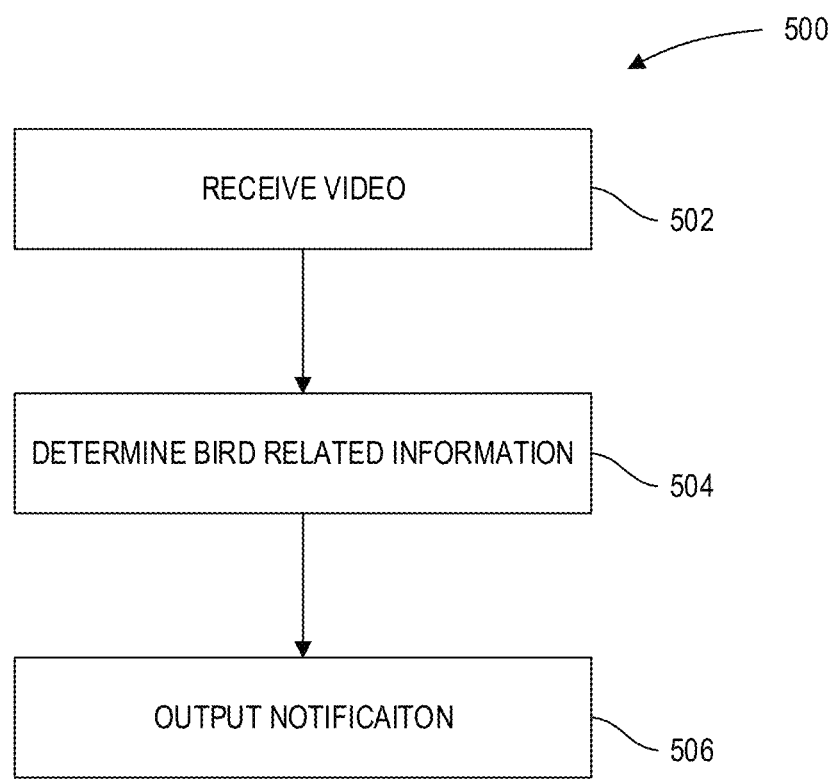
FIG. 33 is a flow chart of a method for monitoring birds in accordance with an exemplary embodiment.

In one embodiment, a node 404 includes a system memory that includes computer readable program instructions for carrying the method 500 of FIG. 33. In this embodiment, a user of a user computer system 402 (e.g., the computer system 300) that is connected the cloud computing environment 400 may cause a node 404 to execute the computer readable program instructions to carry out the method 500.

Referring now to FIG. 33 a method 500 for monitoring birds is shown in accordance with an exemplary embodiment. Steps of the method 500 may be stored as computer readable program instructions in a computer readable storage medium (e.g., a computer readable storage medium of a node 404). A processor (e.g., a processor of a node 404) executes the computer readable program instructions for the method 500.

At 502, the processor receives audio and video (e.g., a live video stream) from the camera 184 or the camera 154.

At 504, the processor determines bird related information. The processor analyzes the received video and audio to determine bird related information within the video. Bird related information includes, but is not limited to, a presence of a bird, a presence of a bird within the nest chamber 132, a number of full body bird visits within the nest chamber 132, a number of bird head peeks within the nest chamber 132, a nest building activity within the nest chamber 132, a portal visit (e.g., a bird perched on the portal 142), egg laying within the nest chamber 132, a number of eggs within a nest in the nest chamber 132, a brooding period, a number of hatchlings within the nest chamber 132, a number of offspring survival, fledging activity withing the nest chamber 132, a feeding activity within the nest chamber 132, predator activity, etc. In some embodiments in response to determining a presence of a bird within the image, the processor may also determine what species the bird is. The processor may execute image and audio recognition software that is stored as computer readable instructions in a storage medium of a node 404 to determine the bird related information within the received image. The processor may further determine the bird related information based on a user input. For example, a user of the computer system 300 may access the video received by the processor as previously discussed herein and identify bird related information and input bird related information into a GUI provided by the computer system 300. In response to receiving the bird related information, the processor sends a signal indicative of the input information to the cloud computing environment 400 which associates the input with the saved video. In some embodiments, the input bird related information may include personalized information (e.g., a bird name, birdhouse name, observations of activity (e.g., nest building, egg laying, egg hatching, number of offspring), dates of activities, etc.).

In some embodiments wherein the processor automatically determines bird related information, at 506, the processor outputs a notification (e.g., a push notification) to the computer system 300 and in response to receiving the notification, the computer system 300 displays the notification. The notification may include the determined bird related information. In other embodiments, the notification may prompt a user of the computer system 300 for additional information or may provide additional information relating to a species of bird identified in the video (e.g., migratory habits, nesting habits, scientific classification, scientific name, etc.). furthermore, the notification may include a prompt asking a user of the computer system 300 if the user would like to view the video associated with the notification. In response to the user selecting the prompt to provide the video, the processor outputs the video with the determined bird related information to the computer system 300.

In other embodiments the notification may further include a prompt to share the video to a third party (e.g., a social media website). In response to the user selecting the prompt to share the video, the processor uploads the video with the automatically determined bird related information and any user input bird related information to a third-party website and/or provides a link to the video to the computer system 300.

As previously discussed, the above may be implemented by way of computer readable instructions, encoded or embedded on computer readable storage medium (which excludes transitory medium), which, when executed by a processor(s), cause the processor(s) to carry out the methods of the present disclosure.

While the invention has been illustrated and described in detail in the drawings and foregoing description, such illustration and description are to be considered illustrative or exemplary and not restrictive; embodiments of the present disclosure are not limited to the disclosed embodiments. Other variations to the disclosed embodiments can be understood and effected by those skilled in the art in practicing embodiments of the present disclosure, from a study of the drawings, the disclosure, and the appended claims.

In the claims, the word "comprising" does not exclude other elements or steps, and the indefinite article "a" or "an" does not exclude a plurality. A single processor or other processing unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

What is claimed is:

1. A birdhouse comprising:
a housing including an inner volume;
a camera platform disposed within the inner volume, wherein the camera platform divides the inner volume into a nest chamber and a wiring chamber;
a camera connected to the camera platform;
a portal in open communication with the nest chamber and an environment external from the housing; and
a channel extending through the nest chamber and in open communication with the wiring chamber and the external environment, wherein the channel is configured to retain wiring,
wherein a rotatable latch is employed to retain the camera in a position vertically below the camera platform.

2. The birdhouse of claim 1, wherein the housing includes a ventilation gap in open communication with the wiring chamber and the external environment.

3. The birdhouse of claim 2, wherein the camera platform is sized and shaped based on a size and shape of the camera.

4. The birdhouse of claim 3, wherein the wiring chamber is vertically above the nest chamber and the camera is disposed within the nest chamber.

5. The birdhouse of claim 4, further comprising:
a nest chamber door that provides access to the nest chamber when open; and
a wiring chamber door that provides access to the wiring chamber when open, wherein the nest chamber door and the wiring chamber door are different.

6. The birdhouse of claim 1, wherein the wiring chamber is vertically above the nest chamber and the camera is disposed within the wiring chamber.

7. The birdhouse of claim 6, wherein the camera platform includes an aperture extending through the camera platform and a lens of the camera is positioned vertically above or extends through the aperture.

8. The birdhouse of claim 1, wherein a bottom wall defines a bottom of the nest chamber and includes a plurality of beveled corners and each of the beveled corners of the bottom wall define an opening that is communication with the nest chamber and the external environment, and
wherein the camera platform includes a plurality of beveled corners and each of the beveled corners of the camera platform define an opening that is communication with the wiring chamber and the nest chamber.

9. The birdhouse of claim 8, further comprising:
a nest chamber floor plate disposed in the nest chamber, wherein the nest chamber floor plate covers the openings defined by the beveled corners of the bottom wall; and
a wiring chamber floor plate disposed in the wiring chamber, wherein the wiring chamber floor plate covers the openings defined by the beveled corners of the camera platform.

10. The birdhouse of claim 1, wherein the camera disposed within the inner volume is a first camera and further comprising:
a second camera connected to an exterior surface of the housing.

11. The birdhouse of claim 10, wherein the second camera is connected to the exterior surface of the birdhouse via an arm that includes a conduit, wherein the conduit is in open communication with the channel and is configured to retain wiring associated with the second camera.

12. The birdhouse of claim 11, wherein the camera platform disposed within the inner volume is a first camera platform and the second camera is connected to a second camera platform that is connected to the arm, and
wherein the second camera platform is sized and shaped based on a size and shape of the second camera.

13. The birdhouse of claim 1, wherein the camera is removably connected to the camera platform.

14. The birdhouse of claim 1, further comprising:
a solar panel connected to an exterior surface of the housing, wherein the solar panel is connected to the camera.

15. The birdhouse of claim 1, wherein a bottom wall defines a bottom of the nest chamber and the birdhouse further comprises:
a plurality of perching grooves disposed on a surface of the nest chamber, wherein each of the plurality of perching grooves are spaced equally apart at a specific height above the bottom wall thereby allowing a specific determination of the height of a nest within the nest chamber.

16. The birdhouse of claim 1, further comprising at least one plate disposed within the nest chamber, wherein the plate reduces a size of the nest chamber.

17. The birdhouse of claim 1, further comprising:
at least one opening covered with a mesh, wherein the at least one mesh covered opening provides ventilation between the inner volume and the exterior environment.

18. A birdhouse comprising:
a housing including a nest chamber;
a camera connected to an external surface of the housing via an arm, wherein the arm includes a conduit configured to retain wiring; and
a channel extending through the nest chamber and in open communication with the conduit and an environment external from the housing, wherein the channel is configured to retain wiring.

19. The birdhouse of claim 18, wherein the housing comprises a camera platform that divides an inner volume of the housing into the nest chamber and a wiring chamber.

20. The birdhouse of claim 19, wherein the wiring chamber is vertically above the nest chamber.

21. The birdhouse of claim 20, further comprising:
a nest chamber door that provides access to the nest chamber when open; and
a wiring chamber door that provides access to the wiring chamber when open, wherein the nest chamber door and the wiring chamber door are different.

22. The birdhouse of claim 20, wherein a bottom wall defines a bottom of the nest chamber and includes a plurality of beveled corners and each of the beveled corners of the bottom wall define an opening that is in communication with the nest chamber and an external environment, and
wherein the camera platform includes a plurality of beveled corners and each of the beveled corners of the camera platform define an opening that is communication with the wiring chamber and the nest chamber.

23. A birdhouse comprising:
a housing including an inner volume;
a camera platform disposed within the inner volume, wherein the camera platform divides the inner volume into a nest chamber and a wiring chamber;
a camera connected to the camera platform;
a portal in open communication with the nest chamber and an environment external from the housing;
a channel extending through the nest chamber and in open communication with the wiring chamber and the external environment, wherein the channel is configured to retain wiring, wherein a bottom wall defines a bottom of the nest chamber,
a nest chamber floor plate disposed in the nest chamber, wherein the nest chamber floor plate covers an opening defined by beveled corners formed in the bottom wall; and
a wiring chamber floor plate disposed in the wiring chamber, wherein the wiring chamber floor plate covers openings defined by beveled corners formed in the camera platform.

* * * * *